United States Patent
Safadi

Patent Number: 5,892,910
Date of Patent: Apr. 6, 1999

[54] CATV COMMUNICATION SYSTEM FOR CHANGING FIRST PROTOCOL SYNTAX PROCESSOR WHICH PROCESSES DATA OF FIRST FORMAT TO SECOND PROTOCOL SYNTAX PROCESSOR PROCESSES DATA OF SECOND FORMAT

[75] Inventor: Reem Safadi, Horsham, Pa.

[73] Assignee: General Instrument Corporation, Horsham, Pa.

[21] Appl. No.: 402,027

[22] Filed: Mar. 10, 1995

Related U.S. Application Data

[63] Continuation-in-part of Ser. No. 395,325, Feb. 28, 1995, abandoned.

[51] Int. Cl.[6] .................................................. G06F 13/00
[52] U.S. Cl. ...................................... 395/200.47; 348/10
[58] Field of Search .................................. 395/500, 831, 395/830, 834, 864, 866, 867, 200.47, 200.51, 200.49; 348/6, 7, 8, 10, 12

[56] References Cited

U.S. PATENT DOCUMENTS

| | | | |
|---|---|---|---|
| 3,803,491 | 4/1974 | Osborn | 325/53 |
| 4,079,452 | 3/1978 | Larson et al. | 395/831 |
| 4,245,245 | 1/1981 | Matsumoto et al. | 358/122 |
| 4,533,948 | 8/1985 | McNamara et al. | 358/122 |
| 4,638,356 | 1/1987 | Frezza | 358/118 |
| 4,677,685 | 6/1987 | Kurisu | 455/1 |
| 4,689,619 | 8/1987 | O'Brien, Jr. | 340/825.08 |
| 4,710,955 | 12/1987 | Kauffman | 380/10 |
| 4,712,239 | 12/1987 | Frezza et al. | 380/13 |
| 4,755,995 | 7/1988 | Anderson et al. | 395/183.07 |
| 4,766,534 | 8/1988 | DeBenedictis | 395/200.58 |
| 5,003,591 | 3/1991 | Kauffman et al. | 380/10 |
| 5,054,911 | 10/1991 | Ohishi et al. | 356/5 |
| 5,058,160 | 10/1991 | Banker et al. | 380/20 |
| 5,142,528 | 8/1992 | Kobayashi et al. | 370/469 |
| 5,142,680 | 8/1992 | Ottman et al. | 330/66 |
| 5,155,837 | 10/1992 | Liu et al. | 395/500 |
| 5,225,902 | 7/1993 | McMullan, Jr. | 358/86 |
| 5,261,055 | 11/1993 | Moran et al. | 375/858 |
| 5,280,627 | 1/1994 | Flaherty et al. | 395/700 |
| 5,359,730 | 10/1994 | Marron | 395/650 |
| 5,367,571 | 11/1994 | Bowen et al. | 348/10 |
| 5,410,703 | 4/1995 | Nilsson et al. | 395/700 |
| 5,440,632 | 8/1995 | Bacon et al. | 395/200.51 |
| 5,555,418 | 9/1996 | Nillsson et al. | 395/700 |
| 5,559,549 | 9/1996 | Hendricks et al. | 348/6 |
| 5,598,410 | 1/1997 | Stone | 395/670 |
| 5,600,364 | 2/1997 | Hendricks et al. | 348/1 |

*Primary Examiner*—Moustafa M. Meky
*Attorney, Agent, or Firm*—Volpe and Koenig, P.C.

[57] ABSTRACT

An adaptive protocol CATV communication system is embodied in a decentralized communication arrangement, wherein the communicating nodes are located at various points within the CATV system. Each communicating node has two protocol syntax processing components: 1) a protocol syntax processor (PSP) which is a downloadable software component that processes of incoming frames; and 2) an adaptive protocol processor which is a fixed software component that oversees the replacement of an old PSP with a new PSP. A master node initiates the migration from an old PSP to a new PSP by sending the new PSP image frames to a slave node. After the new PSP image is complete, the slave node enters a verification mode to test the new PSP. The master node sends special test frames to the slave node to verify the operability of the new PSP by using the old PSP. The results of the verification are conveyed back to the master node to take the appropriate actions. The CATV system remains fully operational for the duration of the PSP upgrade since the frequencies allocated for video programming differ from the frequencies allocated for data transmission.

28 Claims, 13 Drawing Sheets

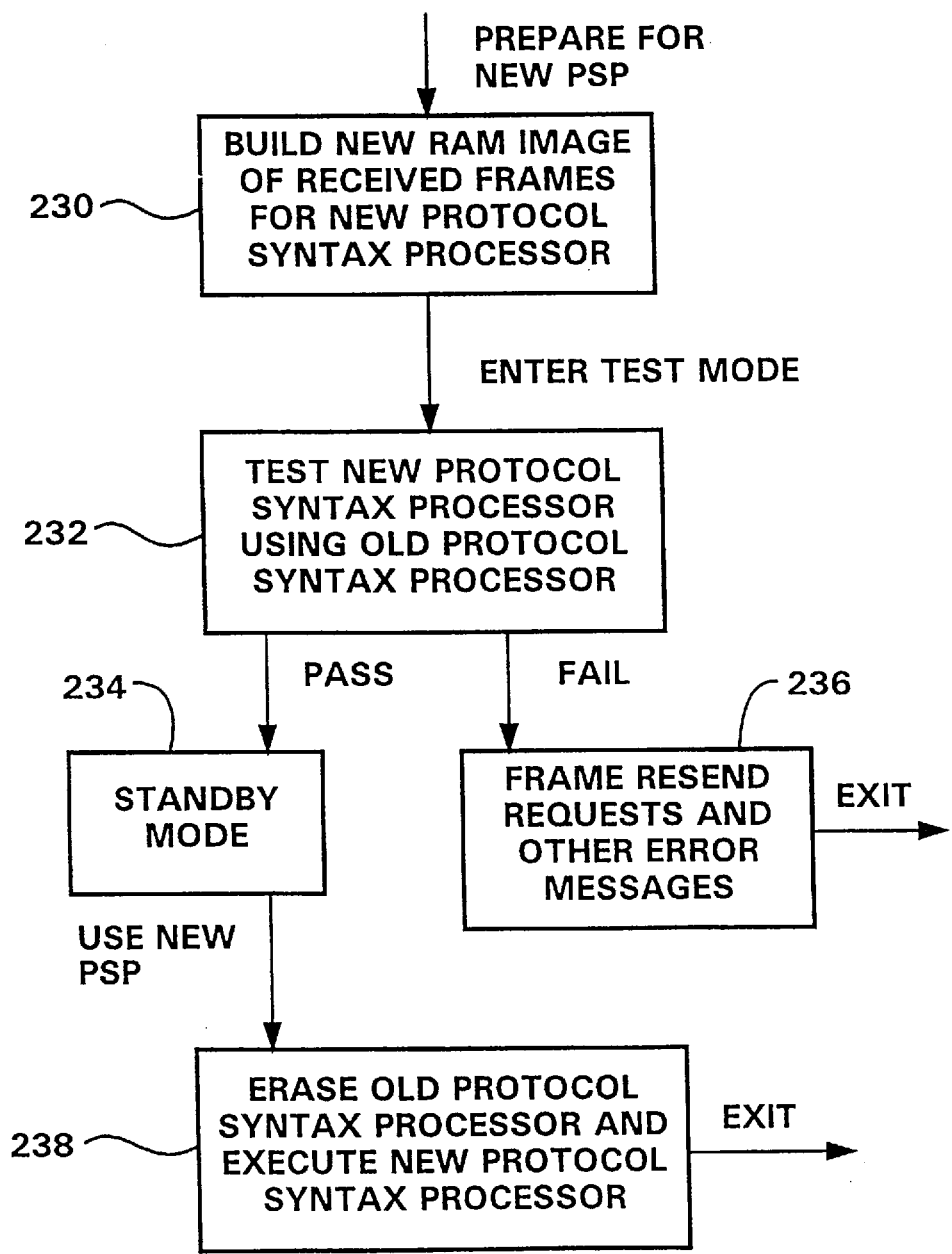

CATV COMMUNICATION SYSTEM FOR CHANGING FIRST PROTOCOL SYNTAX PROCESSOR WHICH PROCESSES DATA OF FIRST FORMAT TO SECOND PROTOCOL SYNTAX PROCESSOR PROCESSES DATA OF SECOND FORMAT

CROSS-REFERENCE TO RELATED APPLICATIONS

This application is a continuation-in-part to application Ser. No. 08/395,325 filed Feb. 28, 1995, now abandoned entitled DISTRIBUTED SYSTEM ARCHITECTURE FOR DIGITAL BROADCAST AND INTERACTIVE SERVICES to Reem Safadi. This application is also related to application Ser. No. 08/402,007 filed concurrently herewith, now U.S. Pat. No. 5,572,517, entitled CONFIGURABLE HYBRID MEDIUM ACCESS CONTROL FOR CABLE METROPOLITAN AREA NETWORKS to Reem Safadi, which is incorporated by reference as if fully set forth herein.

BACKGROUND OF THE INVENTION

1. Field of the Invention

This invention relates generally to cable television communication systems. More particularly, the invention relates to a cable television communication system which includes an adaptive protocol for remotely upgrading communicating nodes without interrupting system operation.

2. Description of Related Art

Over the last two decades, the availability of cable television (CATV) service to individual homes has increased dramatically. A number of different types of CATV communication systems have evolved to provide a broader array of CATV services. Conventional one-way CATV systems primarily provide video programming services, which are sent over the CATV physical link in a downstream direction, from the headend of a CATV system to a plurality of subscriber units.

Two-way CATV systems have become increasingly standard in the industry as the popularity and diversity services has grown, such as pay per view (current) and interactive banking and home shopping (near future). Two-way CATV systems support both downstream and upstream communication. Accordingly, individual subscribers may communicate with the headend, other subscribers or service providers within the system. These systems also permit subscribers to select specific video programming or consumer services and pay only for those services which are used.

CATV communication systems may be either centralized or decentralized. A centralized system concentrates all communication and service functions at the headend of the system. The disadvantage with the centralized system design is that it requires complete compatibility for equipment design and data formats between the network operator, the service provider and the equipment manufacturer. Further, the centralized network architecture requires complex headend equipment capable of processing all of the different data services simultaneously.

In a decentralized system, the network operator provides the base physical transmission network and a protocol for communication between subscriber units and service providers. Each subscriber unit and each service provider define a separate node within the CATV system. The network operator monitors the status of the system to ensure that the system is operating properly and within established parameters. The network operator also controls which nodes can access the system. A two-way CATV communication system with a decentralized network intelligence is disclosed in U.S. Pat. No. 4,533,948 (McNamara et al.), which is herein incorporated by reference as if fully set forth.

To communicate between CATV nodes, the CATV system uses a communication protocol for data transmission. Protocol syntax processors must also be provided at each node for processing received data in accordance with the specific system protocol. The protocol syntax processor may consist of hardware components or may comprise software that is downloaded into each node. When in receive mode, the processor receives incoming frames of a protocol, which typically comprise a plurality of nested layers of predefined fields. The processor strips off the outermost layer, which contains the information needed to establish the basic communication functions for the incoming frames. The remaining frame components, related to higher level functions, are forwarded for further processing by the node. When in transmit mode the processor adds the functional layer header onto the data to be transmitted, thereby nesting the data within the functional layer. In this manner, the protocol facilitates node to node communications through the CATV system.

Existing CATV communication systems utilize fixed protocol syntax processors designed to process a specific protocol. Each protocol may include a revision field that identifies the protocol version being used by the system. Often, the protocol version is one of the parameters that is negotiated between the functional layers in a server and a client.

The revision field identifies how the frame should be processed, for example, which fields within the frame should be processed by the protocol syntax processor and which may be ignored. The revision field permits the expansion and revision of a protocol. However, any changes made to the protocol are inherently limited in order to maintain compatibility with the existing protocol syntax processor since the protocol syntax processor within each node is fixed.

Existing CATV protocols do not provide for complete replacement of the protocol syntax processor, thereby posing serious limitations on existing CATV systems. When upgrades to the physical transmission network or the protocol are required to employ new technologies or services that may not yet be envisioned, existing protocols may be incompatible with the changes. Accordingly, present system upgrades may require individual installation of completely new protocol syntax processors on each communicating node. This procedure is labor-intensive and cost prohibitive.

SUMMARY OF THE INVENTION

The adaptive protocol CATV communication system of the present invention overcomes many of the backward compatibility problems associated with previous protocols. The adaptive protocol is preferably embodied in a decentralized communication arrangement wherein the communicating nodes include a message originating node (a master node such as the network operator's network controller) and a message receiving node (a destination node such as a subscriber's television settop terminal/convertor). The communicating nodes are located at various points within the CATV system.

In accordance with the present invention, each communicating node has two protocol syntax processing components. The first processing component is a protocol syntax processor (PSP) which is a downloadable software component that processes the outermost layer of incoming frames and forwards the remaining frame component related to higher level functions for further processing by the node. All communicating nodes start out with a known (PSP) which is resident in a non-volatile random access memory (RAM). The second processing component is an adaptive protocol processor (APP), which is a fixed software component that oversees the replacement of an old PSP with a new PSP.

The adaptive protocol comprises an existing protocol that is recognized by all communicating nodes. In addition to the usual functions associated with all communication protocols, the adaptive protocol includes: 1) a predefined set of frames within the existing protocol which is used to download a replacement protocol syntax processor; and 2) a predefined universal subframe which is recognizable by all protocols to aid in node recovery, thereby preventing permanent loss of a node's communicating ability.

In accordance with the present invention, a master node initiates the migration from an old PSP to a new PSP by sending the new PSP image frames to the destination node (hereinafter the slave node). After the new PSP image is downloaded, the slave node enters a verification mode to test the new PSP, wherein the master node sends special test frames to the slave node to verify the operability of the new PSP by using the old PSP. The test frames use the old protocol syntax to encapsulate information represented in the new protocol syntax. The verification is carried out on the frame portion that is utilizing the new protocol to ensure that the new PSP is operating properly. The results of the verification are conveyed back to the master node to take the appropriate action.

When the verification is complete, the slave node enters a standby mode, wherein the node accepts new frames but may still default to the old protocol syntax processor if a problem occurs. This upgrade and verification is performed on all slave nodes of interest. The master node then sends an activate-frame to all upgraded slave nodes (in standby mode) using the new protocol and then the slave nodes dispose of the old PSP to free up the RAM and use the new PSP thereafter. Alternatively, the old PSP may not be discarded until a defined period of time has elapsed with no node failures due to the system upgrade. After the upgrade is complete, the physical transmission network changes associated with the new protocol may be performed.

During upgrading of the physical transmission network and the protocol syntax processor, the slave node remains on-line to receive video programming and services over the CATV system and to transmit requests for services from the node. The CATV system remains fully operational for the duration of the PSP upgrade since the frequencies allocated for video programming differ from the frequencies allocated for data transmission.

Accordingly, it is an object of the present invention to provide a method for remotely upgrading CATV communication nodes as new technologies are developed and new services are defined.

It is a further object of the invention to provide a CATV communication system which is easily upgradable.

It is a further object of the invention to provide a method for changing protocol syntax processors without interrupting operation of the CATV communication system by physical replacement of the settop terminals within the system.

Other objects and advantages of the system will become apparent to those skilled in the art after reading the detailed description of a presently preferred embodiment.

BRIEF DESCRIPTION OF THE DRAWINGS

FIG. 10 is a flow diagram of the migration from an old protocol syntax processor to a new protocol syntax processor;

| TABLE OF ACRONYMS | |
|---|---|
| AAL5 | ATM Adaption Layer 5 |
| AC | Addressable Controller |
| ASEM | Access Subnetwork Element Manager |
| ATM | Asynchronous Transfer Mode |
| APP | Adaptive Protocol Processor |
| CLP | Cell Loss Priority (ATM) |
| CRC | Cyclic Redundancy Code |
| DLL | Data Link Layer |
| DSA | Dynamic Slot Allocation |
| DTE | Data Terminal Equipment |
| ECM | Entitlement Control Messages |
| EIA | Electronics International Association |
| EMM | Entitlement Management Messages |
| FDM | Frequency Division Multiplexing |
| FTTN | Fiber To The Node |
| GFC | Generic Flow Control (ATM) |
| HEC | Head Error Check (ATM) |
| HFC | Hybrid Fiber Coax |
| IBTM | In-band Transport Multiplex |
| IP | Internet Protocol |
| IR | Infrared |
| IPPV | Impulse Pay Per View |
| ITEM | Integrated Transport Encryption Multiplexer |
| LAN | Local Area Network |
| LLC | Logical Link Control |
| L1G | Level One Gateway (regulated by the FCC) |
| L2G | Level Two Gateway (unregulated by the FCC) |
| MAC | Medium Access Control |
| MPEG2 | Motion Picture Expert Group 2 |
| MPTS | Multi Program Transport Multiplex (MPEG2) |
| NVRAM | Non-Volatile Random Access Memory |
| PES | Packetized Elementary Stream |
| PSI | Program Specific Information |
| OAM&P | Operation Administration Maintenance And Provisioning |
| OBTM | Out Of Band Transport Multiplex |

-continued

TABLE OF ACRONYMS

| | |
|---|---|
| OSI | Open Systems Interconnection |
| OSS | Operation Support System |
| PAT | Program Association Table (MPEG2) |
| PCR | Program Clock Reference (MPEG2) |
| PCS | Personal Communication Services |
| PDU | Protocol Data Unit |
| PID | Packet Identifier |
| PMT | Program Map Table |
| POP | Plain Old Polling |
| POTS | Plain Old Telephony Service |
| PPV | Pay Per View |
| PSI | Program Specific Information |
| PSP | Protocol Syntax Processor |
| PT | Payload Type |
| QAM | Quadrature Amplitude Modulation |
| QPSK | Quadrature Phase Shift Keying |
| RSR | Random Slot Reservation |
| SDU | Service Data Unit |
| SPTM | Single Program Transport Multiplex (MPEG2) |
| STT | Settop Terminal |
| VCC | Virtual Channel Connection (ATM) |
| VCI | Virtual Channel Identifier (ATM) |
| VDT | Video Dial Tone |
| VIP | Video Information Provider (information owner) |
| VIU | Video Information User (subscriber) |
| VPI | Virtual Path Identifier (ATM) |
| WAN | Wide Area Network |

DETAILED DESCRIPTION OF THE PREFERRED EMBODIMENT

Figure 1:
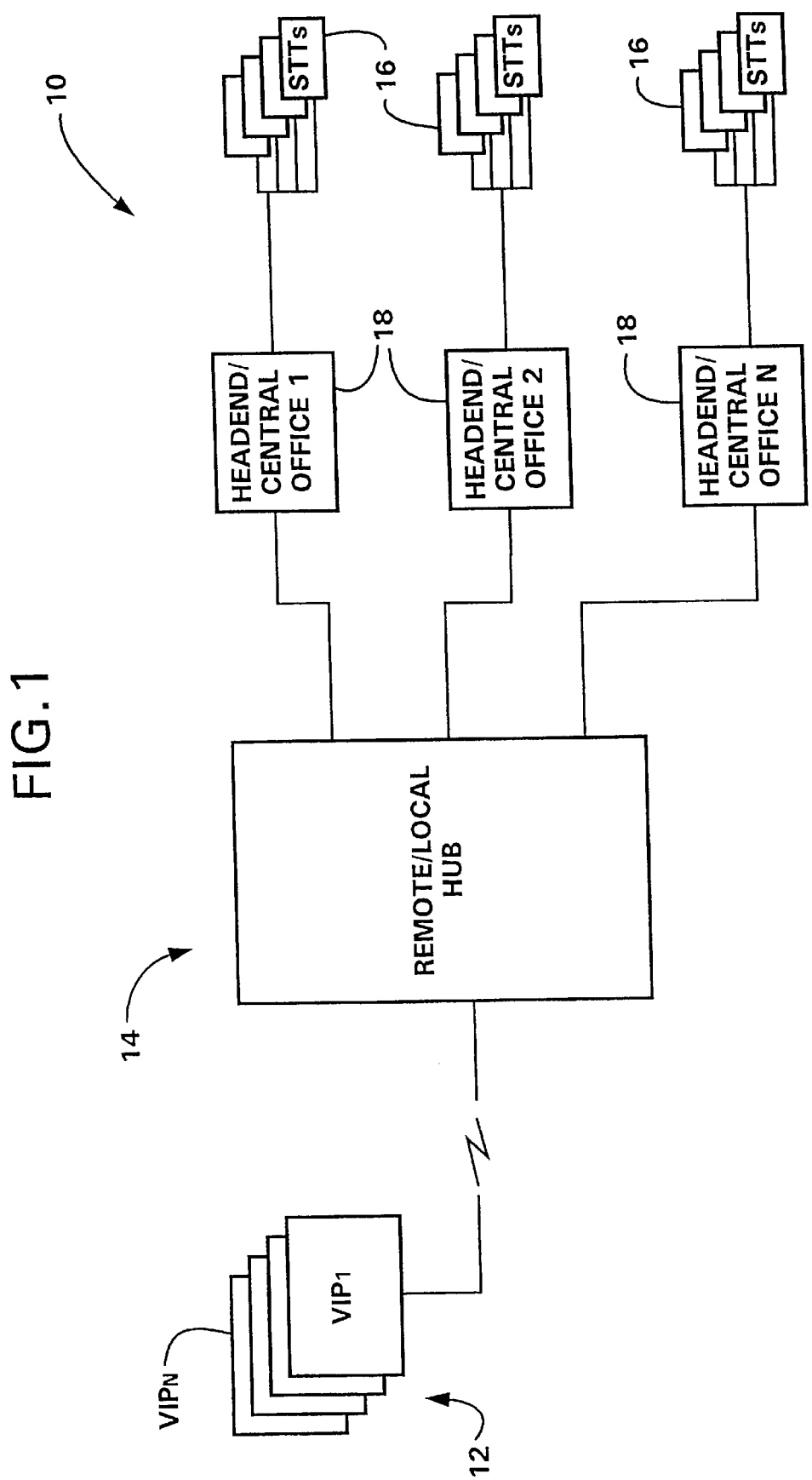
FIG. 1 is a block diagram of an end-to-end cable television communication network embodying the present invention.

A CATV communication network 10 embodying the present invention is shown in FIG. 1. The communication network 10 generally comprises a remote/local hub 14 which communicates with a plurality of headends/central office 18, each of which in turn communicate with a plurality of settop terminals (STTs) 16. The STTs 16 are the interface between the television of a video information user (VIU) and the communication network 10. The remote/local hub 14 may be physically located remote from the headends 18 or, alternatively, may be located at the site of any one of the headends 18. The communication network 10 interfaces with a plurality of video information providers (VIPs) 12 which provide compressed digital video and services. Through the remote hub 14 and the headends 18, the communication network 10 provides two-way transparent (protocol stack independence, layer 3–7) data transport service between the VIPs 12 and the video information users at the STTs 16. The hub 14 provides broadcast information services from the VIPs 12 to all STTs 16 on the network 10. The headends 18 facilitate interactive communications between the VIPs 12 and the STTs 16 that are served by that particular headend 18. In the preferred embodiment of the invention, communications between the VIPs 12, the remote/local hub 14 and the headend/central offices 18 are transmitted over a fiber optic medium.

To provide the bi-directional communication flow over the network 10, the frequency spectrum of the physical medium from the headend 18 to the STTs 16 is divided into a downstream signal path originating at the headend 18 and an upstream signal path originating at the STTs 16. The bandwidth of the physical medium in the preferred embodiment extends up to 1 GHz. The downstream bandwidth typically employs frequencies above 50 MHz, and the upstream frequencies below 50 MHz. The downstream and upstream bandwidths are further divided into 6 MHz channels. In the present invention, a portion of the 6 MHz channels are allocated for analog communications and the remainder for digital communications. Accordingly, analog and digital communications may be frequency division multiplexed (FDM) over the separate channels and transported over the same physical medium. Analog CATV communication systems are well known in the art, such as the system disclosed in U.S. Pat. No. 4,533,948, (to McNamara et al.) and in U.S. Pat. No. 4,245,245, (to Matsomoto et al.), which are incorporated by reference as if fully set forth.

Figure 2:
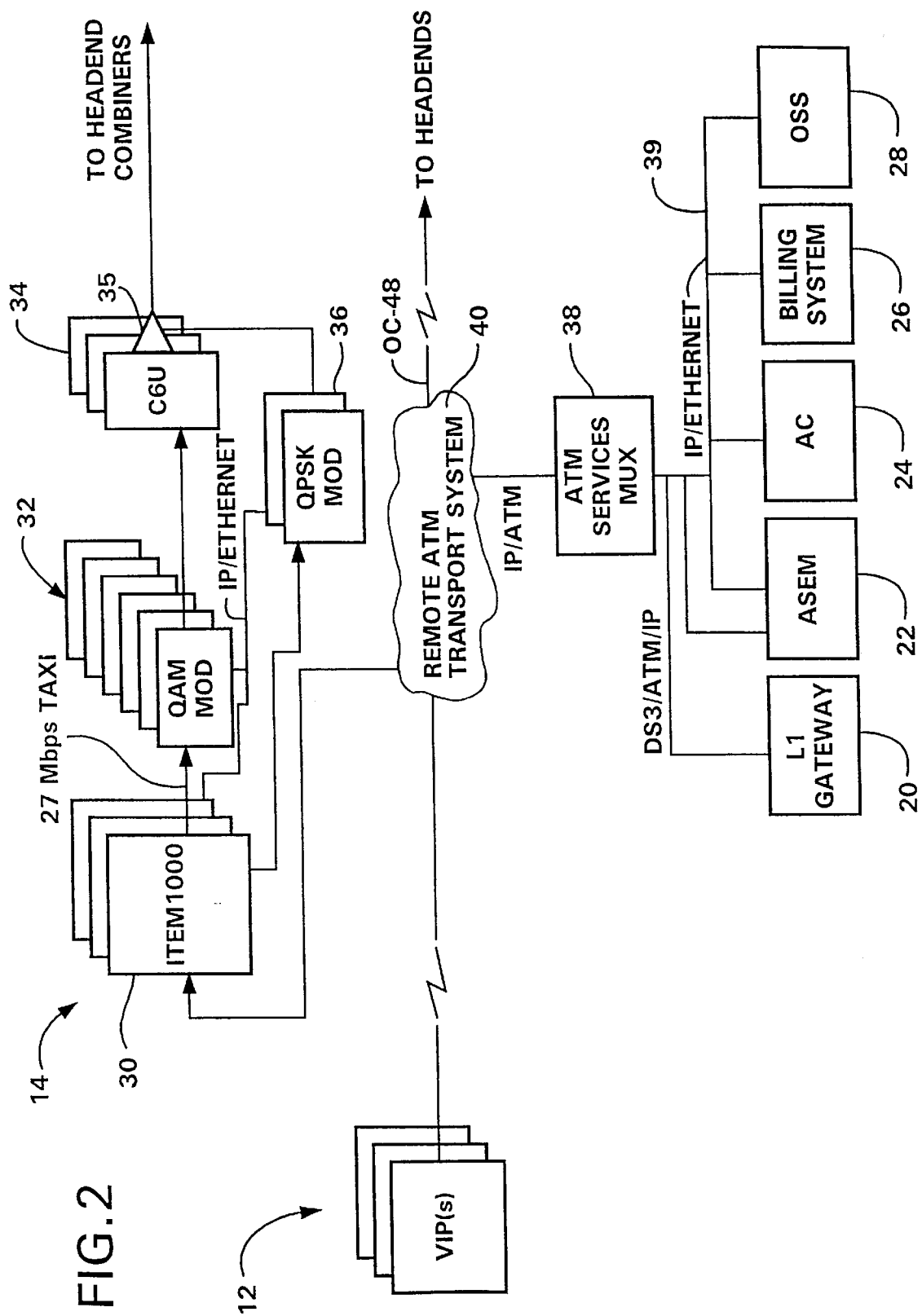
FIG. 2 is a block diagram of the remote/local hub of the present invention.

Referring to FIG. 2, a remote/local hub 14 made in accordance with the teachings of the present invention is shown. The hub 14 includes a level 1 gateway (L1G) 20, an access subnetwork element manager (ASEM) 22, an addressable controller (AC) 24, a billing system 26 (co-located or remotely located), an operations support system (OSS) 28 (co-located or remotely located), an integrated transport encryption multiplexer (ITEM) 30, a 64 quadrature amplitude modulation (QAM) modulator 32, an RF upconverter 34, a quadrature phase shift keying (QPSK) modulator 36 (optional) and an asynchronous transfer mode (ATM) services multiplexer 38. A backbone subnetwork 40 provides the physical medium and the optical to electrical interface for components within the hub 14 to communicate with each other and for outside entities (such as the VIPs 12 and STTs 16) to communicate with, and through, the hub 14. Communications between the hub 14 and the headend 18 elements are conducted via Internet protocol, asynchronous transfer mode (IP/ATM) signaling in WAN connectivity and IP/Ethernet in LAN connectivity. There may be more than one of each of these components depending upon system capacities (i.e. desired number of channels for the ITEM 30, number of subscribers for the AC 24 etc.).

The specific components which comprise the network architecture of the present invention will now be presented in detail. The video information provider (VIP) 12 consists of a level two gateway (L2G) and associated servers. The L2G acts as an interface between the VIP 12 and the network 10. The VIPs 12 are the source of live, archival broadcast or interactive service content, (comprising electronic encyclopedias, electronic catalogs, downloadable applications, movies, etc.), communications with the network 10, and service menus. The L2G communicates with the L1G 20 to manage the establishment and termination of service/session connections between the VIUs and the VIPs 12. The L2G also provides menu presentation and selection processing to and from the VIUs, performs VIU authentication and forwards billing information, for VIP 12 provided services to the billing system 26.

The level 1 gateway (L1G) 20 provides overall management of network 10 in support of service delivery from a VIP 12 to a VIU(s). The L1G 20 performs the following functions: 1) management of VIP-VIU interactive sessions through communication with the VIPs 12; 2) VIU authentication and collection of billing information relating to network 10 support of VIP 12/L1G 20 provided services for forwarding to the billing system 26; 3) interactive menu presentation which is responsive to the service selected; and 4) database management of VIU profiles for digital broadcast and interactive services.

The access subnetwork element manager (ASEM) 22 acts as an agent to (i.e. is controlled by) the L1G 20 and/or OSS 28 (depending on the functions to be performed by the ASEM 22). At the direction of the L1G 20, the ASEM 22 provides management of headend 18 components (shown in FIG. 3), much in the same manner as the L1G 20 oversees management of resources on the backbone subnetwork 40 (via a designated backbone network manager not shown).

The ASEM 22 determines which ITEM and network controllers (NC) 62 can accommodate a new connection (based on already utilized resources within each headend 18) and the L1G 20. The ASEM 22 conveys parameters such as ATM virtual path identifier (VPI) and virtual channel identifier (VCI) values for session signaling and session content to the ITEMs 30, 50 and the network controllers 62. The ASEM 22 also conveys associated transmission rates for the downstream ATM VPI/VCI and signaling rates for upstream as conveyed to it by the L1G 20 (these values are originated by the VIP 12/L2G). The ASEM 22 forwards appropriate scheduling parameters to the addressable controller 24 for encryption of pay-per-view (PPV) and impulse-pay-per-view (IPPV) services by the ITEMs 50. In the preferred embodiment of the invention, the ASEM 22 oversees OAM&P (Operation Administration Maintenance and Provisioning) functions through the backbone subnetwork 40 and interfaces with the OSS center 28 to convey status or any OAM&P information of elements within the hubs (Mux/Mods, Demod/Muxes, etc.) to the OSS 28.

The addressable controller 24 manages the secure delivery of broadcast, pay-per-view and non-video-on-demand (staggercast) services, including VIU authorization for those services and program scheduling by controlling the encryption subsystem. Access control and encryption parameters are forwarded to network elements which perform downstream and upstream encryption and decryption. In the preferred embodiment of the invention, downstream encryption is implemented in the ITEMs 30, 50 and downstream decryption is implemented in network modules 70, which are part of each STT 16. Upstream encryption is implemented in the network module 70 and upstream decryption is performed by a network controller 62. For interactive service communications, which are facilitated at the headends 18, the addressable controller 24 preprovisions the ITEMs 50 and the network modules 70 with the appropriate encryption/decryption parameters. For broadcast service communications, which are facilitated by the hub 14, the addressable controller 24 forwards similar parameters to the ITEM 30 based on scheduling information forwarded by the L1G 20 through the ASEM 22.

The integrated transport encryption multiplexer (ITEM) 30 provides secure delivery of broadcast digital services information to the VIUs as an in-band transport multiplex (IBTM). The ITEM 30 originates the IBTM including video, audio, data by performing ATM to MPEG2 reassembly and re-adaption (AAL5) of single program transport multiplex (SPTM). This includes ATM to MPEG2 reassembly of audio-visual content, ATM to AAL5-service data units (SDU) reassembly of non-MPEG2 data and removing jitter and adjusting program clock reference (PCR) timing for audio visual content. The ITEM 30 creates an aggregate MPEG2 multiplex from any input SPTM to any output multi-program transport multiplex (MPTM). In doing so, the ITEM 30 uniquely reassigns packet identifier (PID) values, creates an aggregate stream (program specific information (PSI) including a program association table (PAT) and a program (PMT) map table and selectively encrypts SPTMs as instructed by the ASEM 22. The ITEM 30 updates the aggregate stream PCR and inserts entitlement control messages (ECMs). It also performs similar operations when multiplexing L1G 20 signaling and addressable controller 24 messages (including entitlement management message (EMMs)) on the out-of-band transport multiplex (OBTM) which is then forwarded to the QPSK modulator 36.

The ITEM 30 provides a transport interface for digital broadcast communications between the VIPs 12 and the STT 16 via the backbone subnetwork 40 (or through direct interfaces if co-located). Broadcast audiovisual information and signaling originated by the VIPs 12 is forwarded to the STT 16 via the ITEM 30. More specifically, the ITEM 30 accepts an ATM stream via an ATM/SONET interface (with sustained cell rate version of AAL5) and selects the appropriate cells for MPEG2 packet reassembly based on the value of the VCI which is conveyed by the ASEM 22 to the ITEM 30 during connection establishment. This is achievable since the virtual connection between the VIP 12 and the VIU is maintained end-to-end. The resulting MPEG2 transport multiplex (consisting of multiple audiovisual information streams, protocol-independent, from an ITEM 30 standpoint, information streams carried as AAL5-SDUs (such as stock quotes)) is output to the 64 QAM modulator 32.

In order to ensure secure delivery of a given broadcast audiovisual service, the ITEM 30 selectively encrypts, pursuant to the addressable controller 24 configuration, a given set of MPEG2 program streams within the MPEG2 transport stream. Access control and encryption related information is forwarded to ITEM 30 from the addressable controller 24. The ITEM 30 incorporates this information within the MPEG2 transport stream (per MPEG2 rules where applicable) and encrypts as instructed by the addressable controller 24. Each output of the ITEM 30 is forwarded to a single 64 QAM modulator 32 whose output is converted to the selected downstream channel by an RF upconverter 34 and then combined by an RF combiner 35 for downstream transmission. Each ITEM 30 keeps track of the resources required for a given service.

The QAM modulator 32 accepts the downstream IBTM output of ITEM 30, applies forward error correction and 64 QAM encoding. The output of the QAM modulator 32 is input to the RF upconverter 34.

Downstream OBTM signaling intended for all subscribers from the L1G 20 or the addressable controller 24, (and optional application downloads from the L1G 20, or L1G 20 menus to VIPs 12), are sent from the ITEM 30 to the QPSK modulator 36. The QPSK modulator 36 accepts the output of the ITEM 30. The QPSK mod 36 also provides forward error correction and QPSK modulation for the OBTM transmission. The output is input to the RF combiner 35 for downstream transmission.

The RF upconverter 34 receives the outputs from the QAM modulator 32 for IBTM (and the QPSK modulator 36 for OBTM if upconversion was not performed by the QPSK modulator 36). Each RF upconverter 34 is capable of accepting the output from two modulators 32, 36. The RF upconverter 34 accepts two intermediate carrier frequencies (41 and 47) with an associated RF output which is frequency agile from 50 to 1000 MHz. The upconverter 34 will accept either the QAM modulator output 32 at IF from the ITEM 30 or an analog television channel input (not shown) at IF. The analog inputs will be upconverted to predetermined analog channels. The RF upconverter 34 is controlled either via front panel switches or remotely via the Ethernet interface. The output from the RF upconverter 34 is input to an RF combiner 35.

The RF combiner 35 is a full bandwidth 5 to 1000 MHz 12-way combiner/splitter. It may be used to merge signals from up to twelve channels or to distribute a single signal to twelve outputs. The RF combiner 35 employs directional coupler circuitry to attain high channel isolation for protection from channel to channel interference. The output from the combiner 35 bypasses the processing within the headend 18 and proceeds directly to the headend combiners (not shown) for further combination with the output from the headend 18.

The asynchronous transfer mode (ATM) services multiplexer 38 aggregates the non-null ATM cells from each DS3 interface (up to n DS3 interfaces, where n ranges between 1 and 18 per ATM services mux 38) and forwards the multiplexed cells to the backbone subnetwork 40. It also acts as an ATM edge device for the OAM&P in the headend 18 providing virtual LAN connectivity between the hub 14 and the headends 18. The backbone subnetwork 40 interconnects the LAN 39 where the ASEM 22 and the addressable controller 24 reside to the LAN 61 within the headend 18 to appear as though all components reside on the same LAN.

The operation support system 28 provides the OAM&P services in support of the network 10. The billing system 26 stores the billing information related to each VIU and generates billing statements. The general operation and functions of both of these components is well known to those skilled in the art.

Figure 3:
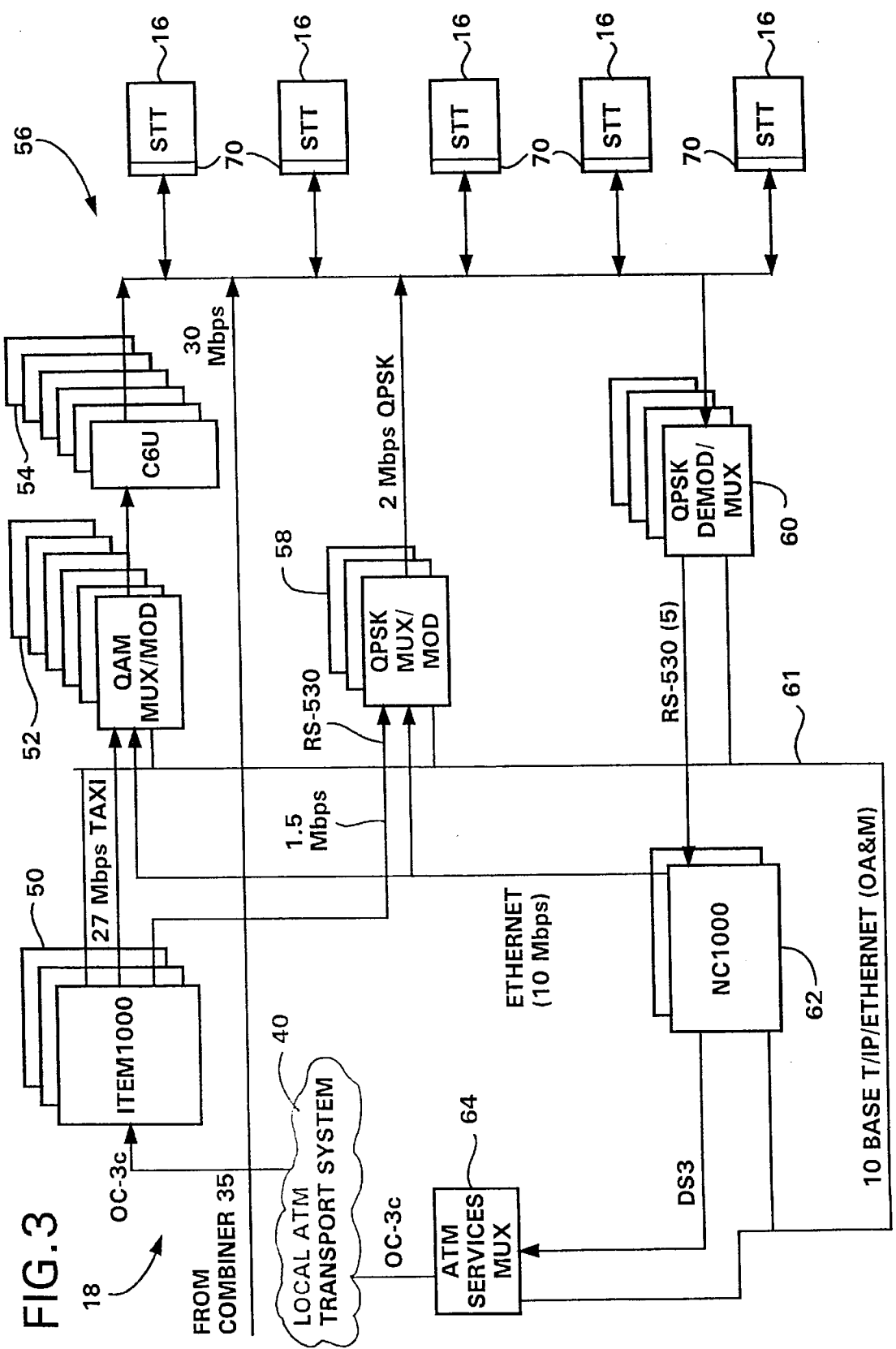
FIG. 3 is a block diagram of a headend/central office of the present invention.

Referring to FIG. 3, a headend 18 made in accordance with the teachings of the present invention is shown. The headend 18 facilitates digital interactive communications between the VIPs 12 and the VIUs. All of the digital broadcast communications which were processed by the hub 14 are further combined at the output of the headend 18 by combiners (not shown). Accordingly, no further processing of the broadcast communications by the headend 18 is required.

The headend 18 includes an ITEM 50, a 64 QAM multiplexer/modulator (mux/mod) 52, an RF upconverter 54, a QPSK multiplexer/modulator (mux/mod) 58, a QPSK demodulator/multiplexer (demod/mux) 60, a network controller 62 and a headend ATM services mux 64. The headend 18 communicates with a plurality of STTs 16 through the CATV transmission network 56. Each STT 16 includes a network module 70 for interfacing with the CATV transmission network 56.

The ITEM 50 provides secure delivery of interactive digital services information to the VIUs as an IBTM. Additionally, it can be configured to provide broadest services to subscribers served by that particular headend 18. The ITEM 50 originates the IBTM including video, audio, data and VIP 12 signaling by performing ATM to MPEG2 reassembly and re-adaption (AAL5) of SPTMs. This includes ATM to MPEG2 reassembly of audio-visual content, ATM to AAL5-SDU's reassembly of session signaling or non-audio-visual session content, and removing jitter and adjusting PCR timing. The ITEM 50 creates an aggregate MPEG2 multiplex, (from the content and signaling of multiple sessions,) from any input SPTM to any output MPTM. As is performed by the ITEM 30 in the hub 14, the ITEM 50 uniquely reassigns PID values, creates an aggregate stream PSI and encrypts each SPTM. The ITEM 50 also updates the aggregate stream PCR and inserts ECMs. It also performs creates an aggregate multiplex of L1G 20 signaling and addressable controller 24 messages, including EMMs, on the OBTM which is then forwarded to the QPSK mux/mod 58. Each ITEM 50 keeps track of the resources required for the active sessions. Should the ASEM 22 need to recover its database, it queries the different ITEMs 50 it oversees through the OAM&P interface (SNMPv2/UDP/Ethernet).

The single physical interface (OC-3c) into the ITEM 50 from the backbone subnetwork 40 allows for rate policing of both session content and signaling by the backbone subnetwork 40.

The QAM multiplexer modulator 52 accepts the downstream IBTM output of ITEM 50, adds signaling information in support of medium access control (MAC), inserts medium-access control synchronization information and applies forward error correction and 64 QAM encoding. The output of the QAM mux/mod 52 is input to the RF upconverter 54.

Downstream OBTM signaling from the L1G 20 or the addressable controller 24, (and optional application downloads from the L1G 20, or L1G 20 menus to VIPs 12), are sent from the ITEM 50 to the QPSK multiplexer modulator 58. The QPSK mux/mod 58 accepts the output of the ITEM 50 and multiplexes MAC information as in the in-band case. The QPSK mux/mod 58 also provides forward error correction and QPSK modulation for the OBTM transmission. The output is input to the RF combiner 59 (not shown) for downstream transmission.

The primary function of the network controller 62 is to administer medium access control (MAC) functions for the network module 70 interfacing to the network 10. MAC is a sublayer of the data link layer which coordinates the transmission of data from various network modules 70 to the headend 18 based on fair access and predictability of performance. The network controller 62 determines the MAC operating parameters based on those supplied by the ASEM 22 including but not exclusive to: 1) fiber to the node (FTTN) size; 2) upstream spectrum allocation (8–12 MHz, 8–15 MHz); 3) return path transmission rates; and 4) QPSK mux/mod 58 and QPSK demux/mod 60 configuration (i.e. connectivity to the network controller 62 which will allow the network controller 62 to route information such as acknowledgments to upstream transmitted packets), through the appropriate QPSK mux/mod 58 or QAM mux/mod 52.

The network controller 62 also administers the type of upstream access that will be required: 1) plain old polling (POP); 2) default assigned TDMA; and 3) dynamically assigned TDMA carriers (frequency and time slot assignments). The resources allocated by the network controller 62 for connection-oriented MAC service requests are based upon the desired session bandwidth passed by the ASEM 22 on behalf of the L1G 20 or the VIP 12. Medium access control acknowledgment messages and information are forwarded to the STTs 16 over Ethernet via the QAM mux/mod 52 and the QPSK mux/mod 58.

The network controller 62 supports upstream access for interactive services requested from STTs 16 by: 1) administering the adaptive MAC operation to maintain guaranteed minimal upstream latency and ensure fair upstream access by all subscribers; and 2) forwarding upstream data to the L1G 20, L2G, or addressable controller 24 via the ATM services mux 64. The network controller 62 also allows for the dynamic provisioning of multiple effective transmission rates according to the needs of the applications and services utilizing the network 10.

The network controller 62 alleviates the L1G 20 from any functions pertaining to upstream access by overseeing network module 70 initialization (default carrier, default time division multiple access (TDMA) transmission time slots, etc.) as well as overseeing dynamic TDMA carrier and time slot assignment whenever a VIP-VIU session is established.

In the preferred embodiment, the network controller 62 is configured to accommodate nx(1.5 Mbps) streams from a QPSK demod/mux 60 (where 1<n<5) and forwards the upstream ATM cells to an appropriate external routing/switching element.

The network module 70 interfaces the STT 16 to the hybrid fiber coaxial (HFC) physical medium 56. The network module 70 facilitates the extraction of RF signals and demodulates (64 QAM or QPSK) these signals. Forward error correction is then performed before any data link layer (DLL) processing takes place. As part of the DLL processing, the network module 70 may decrypt certain IBTM or OBTM components and perform AAL5-SDU based (upper layer) signaling extraction. It forwards AAL5-SDU protocol data units (PDU) to the STT central processing unit as well as the service stream to the other STT processing elements.

The network module 70, under the management of the network controller 62, forwards signaling from the STT 16 to the corresponding network controller 62 which forwards this information to the L1G 20 or to the VIP 12 through the backbone subnetwork 40. The network module 70 also communicates with the addressable controller 24 for access control and decryption/encryption authorization.

The QPSK demod/mux 60 receives up to six upstream carriers, demodulates the carriers and performs forward error correction. The resulting ATM cell streams are multiplexed to form a nominal 1.5 Mbps stream which is forwarded to the network controller 62. Additionally, the QPSK demod/mux 60 forwards measured values of certain physical layer parameters to the network controller 62 for network module 70 power calibration, and performs upstream synchronization supporting functions to facilitate ranging of STTs 16 (propagation delay calibration) for optimal TDMA operation.

The components shown in FIG. 3 which have not been accompanied herein by a specific description operate as the equivalent components shown in FIG. 2.

Although the aforementioned description of the specific components provides an understanding of the function of each component, a thorough understanding of the network architecture of the present invention will be further facilitated by a description of the signaling and communications between network components.

The information from a VIP 12 to a STT 16 flows on an IBTM which is modulated as a 64 QAM signal, while information from the L1G 20 to a STT 16 flows through either an IBTM or an OBTM, modulated as a QPSK signal. A downstream path consists of both an IBTM and an OBTM destined to a STT 16. An upstream signaling path consists of STT 16 to L1G 20, VIP 12, addressable controller 24, or network controller 62 signaling, via the network module 70, through the network controller 62, and through the backbone subnetwork 40. In addition, an upstream path consists of signaling between the network module 70 and the network controller 62. All upstream signals are QPSK modulated.

With respect to the downstream path IBTM, the CATV communication network 10 uses the backbone subnetwork 40 to interconnect the VIP 12 to the ITEMs 30, 50. Digital streams containing compressed video material embedded in ATM cells originate at the VIP 12. AAL5 adaptation is used to transport a MPEG2 SPTM over ATM. Additionally, signaling originating from the VIP 12 to the STT 16 is carried as IP/ATM (or any protocol/ATM) using AAL5 adaptation as well. The ITEMs 30, 50 accept a plurality of the ATM streams, as instructed by the ASEM 22, to create an aggregate MPTM whose aggregate nominal rate is 27 Mbps. The VIP 12 informs the L1G 20 of the service and signaling rates required in support of a given SPTM. The L1G 20 in turn forwards this information to the ASEM 22. The ASEM 22 determines which of the ITEMs 30, 50 present within a given headend 18 can accommodate this SPTM. The ASEM 22 then conveys this parameter along with other parameters such as MPEG2 program number to be assigned to the SPTM, ITEM 30, 50 output port (1 of 6). This mapping from ATM VCI to MPEG2 program number allows the reservation of the virtual channel (connection) end-to-end through the ITEM 30, 50 (and terminated at the STT 16) whenever a new SPTM has to be multiplexed for delivery to a single SST 16 or multiple STTs 16, (single STT 16 in the case of an interactive service and multiple STTs 16 in the case of a broadcast service). The output of the ITEM 30, 50 consisting of a MPTM is then forwarded to the 64 QAM mux/mod 32, 52 and then to the RF upconverter 34, 54 to place the 64 QAM signal in the appropriate 6 MHz channel.

With respect to the downstream path OBTM, the output of the L1G 20 signaling is delivered to the ITEM 30, 50 through the same OC-3c interface as the IBTM. Each ITEM 30, 50 has the capability of generating an OBTM, carrying L1G 20 signaling for L1G-VIU default connections as well as EMMs originating from the addressable controller 24. The OBTM output of the ITEM 30, 50 is forwarded to a QPSK mux/mod 36, 58.

With respect to the upstream path, the STT 16 central processing unit forwards signaling to the network module 70 which segments the data into individual ATM cells (AAL5) and forwards the cell based PDUs to the STT's 16 QPSK modulator (not shown). Any non-VIP-VIU session signaling is sent over a default upstream carrier (such as that destined to the L1G 20 or network controller 62). All session-related signaling is forwarded on a dynamically assigned carrier which is assigned by the network controller 62 during session connection establishment. The VIP 12 specifies the effective session upstream signaling rate and the downstream session signaling and content rate, depending on the activated application, to the L1G 20. The L1G 20 in turn forwards these parameters to the ASEM 22. The downstream rates are forwarded to the ITEM 30, 50 while the upstream signaling rate is provided to the network controller 62. A default upstream signaling rate is assumed by the network controller 62 if the VIP 12 leaves this parameter unspecified. The ASEM 22 also forwards the upstream VPI/VCI pair to the network controller 62 on VIU-VIP session by session basis, which in turn informs the network module 70 during connection establishment phase. The network module 70, as part of the initialization process, is aware of the default upstream carrier and the VPI/VCI values primarily used for STT 16-L1G 20 signaling.

Each upstream carrier is demodulated by a QPSK demod/mux 60 which, in addition to demodulating a given number of carriers, multiplexes the individual upstream PDUs (preserving PDU boundary) and forwards the multiplex to the network controller 62. The network controller 62 examines each PDU and processes it by either forwarding it to the ATM services mux 64 (which performs an ATM relay function to the L1G 20 or the VIPs 12) or forwarding it to the appropriate processing element within the network controller 62 when the PDUs are MAC specific.

Figure 4:
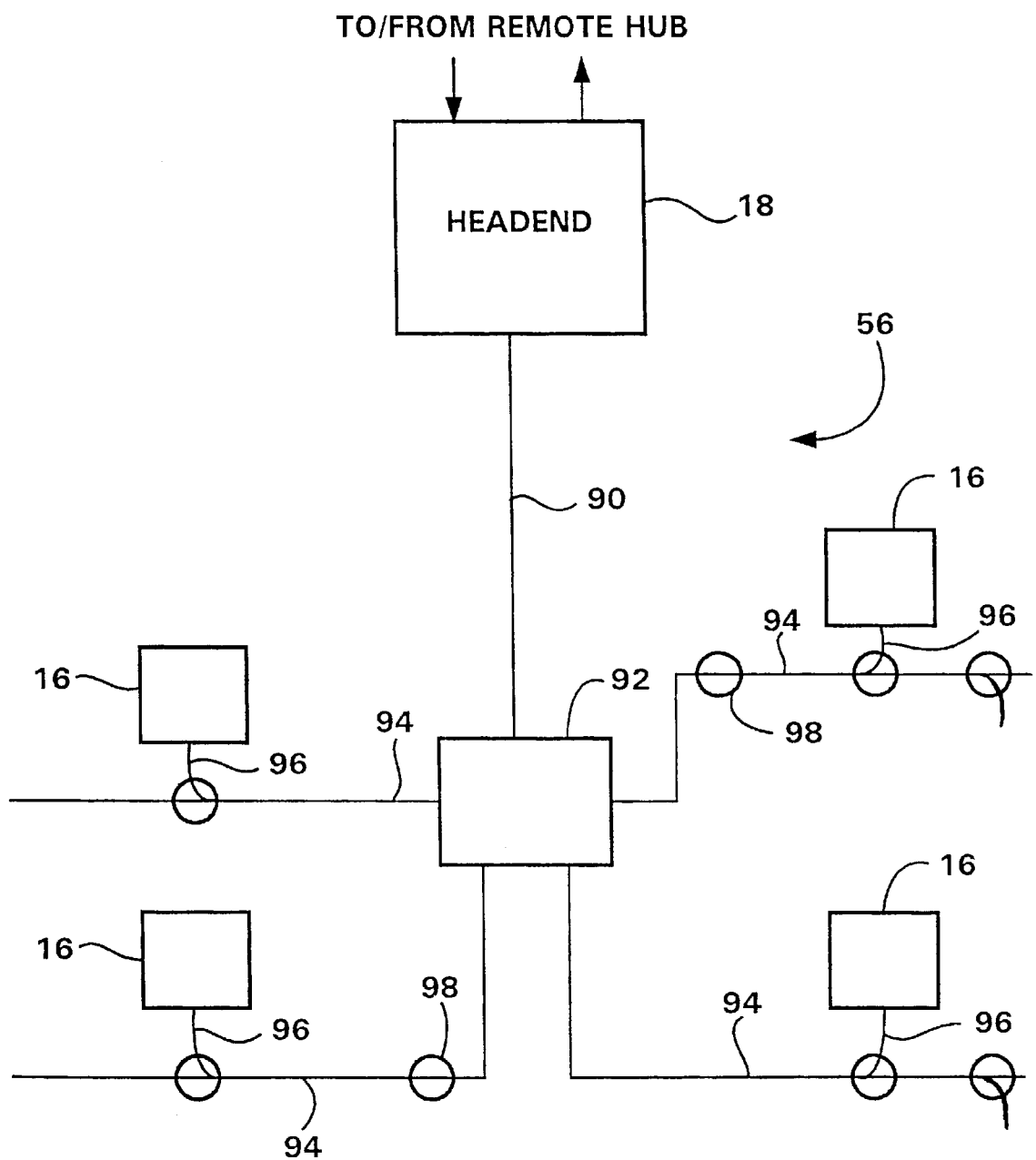
FIG. 4 is a block diagram of the cable television distribution network of the present invention.

Referring to FIG. 4, the topology of the signal transmission network 56 between the headend 18 and the STTs 16 is preferably a hybrid star followed by a tree and branch topology. In the predominantly star-type aspect of the hybrid fiber-coax network, a fiber-optic line 90 is provided from the headend 18 to each node 92. Each node 92 includes forward and return signal amplifiers and splitters/combiners to support the bi-directional communications. The single optical input 90 is converted into an electrical signal which is split into four coaxial feeder lines 94 which are generally dedicated to a limited group of STTs 16 such as neighborhood.

In the predominantly tree and branch aspect of the hybrid network, the feeder lines 94 connect the node 92 to the coaxial drop lines 96 of individual STTs 16. At points where the cable divides, signal splitters/combiners are installed. Signal amplifiers 98 may also be provided along the coaxial feeder lines 94 as required to boost the RF signals and ensure that nominal signal strength levels are maintained.

Table 1 provides the I/O interfaces of each component in the preferred embodiment.

TABLE 1

| COMPONENT | INTERFACES |
|---|---|
| Addressable Controller | I/O:<br>-2/10BaseT Ethernet<br>-32 x RS-232 (4 x multipin-connector driving 8 port concentrator) |
| Network Controller (NC 1000) | Input:<br>-5 x EIA/RS-485 DTE I/F<br>Outputs:<br>-1 x ATM/DS3 (information rate <=9 Mbps)<br>I/O:<br>-2 x Ethernet 10BaseT |
| RF Modules Data Interfaces | 64QAM MUX/MOD<br>-Input: 1 x TAXI @ 27 Mbps<br>-Output: 1 x IF @ 43.75 MHz (75 Ohm F-Connector)<br>-I/O: 2 x Ethernet 10BaseT<br>QPSK MUX/MOD:<br>-Input: 1 x EIA/RS-530 @ 1.5 Mbps<br>-Output: 1 x RF, Range: 71–129 MHz (75 Ohm F-Connector)<br>-I/O: 2 x Ethernet 10BaseT<br>QPSK DEMOD/MUX:<br>-Input: Upto 6 RF Inputs<br>-Output: 1 x EIA/RS-485 @ 1.5 Mbps<br>-I/O: 2 x Ethernet 10Base T |
| Integrated Transport Encryption Mux (ITEM 1000) Data Interfaces | Input:<br>-1 x Optical Carrier 3-Concatenated (OC-3c, 155.52 Mbps)<br>Outputs:<br>-5 x TAXI @ 27 Mbps<br>-1 x RS-530 @ 1.544 Mbps<br>I/O:<br>-1 x Ethernet 10Base T<br>-1 x RS-232 @ 19.2 Kbps |
| Network Module Interfaces | Input:<br>-RF via F Connector<br>Output:<br>-RF Bypass via F Connector<br>Video via RCA phono plug<br>Audio Right and Left Channels via RCA phono plug<br>I/O:<br>-Digital bidirectional interface, (32-pin molex connector) |

Figure 5:
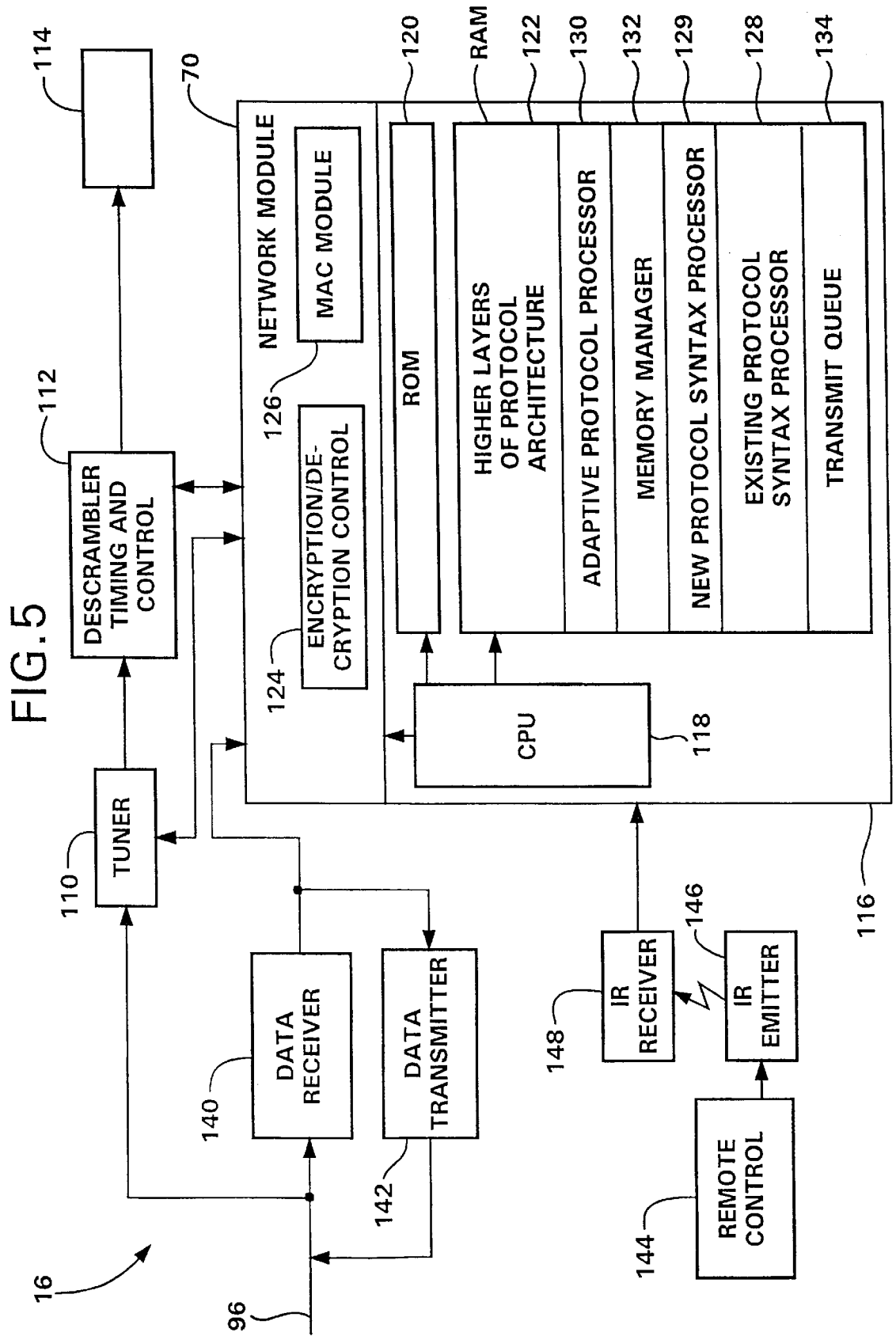
FIG. 5 is a block diagram of a settop terminal of the present invention.

Referring to FIG. 5, a block diagram of a SST 16 is shown. Communications in the downstream path originating at the headend 18 are transmitted through the coaxial drop line 96. Video information signals are processed through a frequency agile tuner 110 and a descrambler timing and control module (optional—if analog video is scrambled) 112 before entering a television set 114. The tuner 110 is responsive to the frequency of the downstream channel selected by the VIU to remove the carrier signal. The descrambler 112 descrambles the baseband signal of the selected channel if the VIU is an authorized user. Similarly, digital video passes through the decryption and then MPEG2 decodes and D/A conversion to forward the composite video for display. (The baseband video signal is placed on a second carrier signal frequency, typically television channel 3 or 4, for input into the television 114). The tuner 110 and descrambler 112 are controlled by the network module 70, which includes an encryption/decryption controller 124 and a MAC module 126.

The network module 70 interfaces with a processor 116 which comprises a central processing unit (CPU) 118, a read only memory (ROM) 120 and a non-volatile random access memory (RAM) 122. Several processing components reside in the RAM 122, including an existing protocol syntax processor 128 (PSP), an adaptive protocol processor 130 (APP), a memory manager 132 and a transmit queue 134. The remaining portion of the RAM 122 is available for processing higher layers of the protocol and for general use. The APP 130, which includes a primitive PSP, is also resident in ROM 120 for initial start-up and recovery operation. The CPU 118, in conjunction with the different processing components in RAM 122, allows the STT 16 to read incoming data frames, parse the frames by sequentially stripping off each nested layer, and perform the application embedded therein.

Data frames within the OBTM forwarded through the headend 18 to the STT 16 are received through a second frequency agile receiver 140, which is tuned to the particular control channel for receiving control messages. In the preferred embodiment, the transmitter 142 transmits communications upstream from the STT 16 to the network controller 62.

The STT 16 is controlled via the subscriber remote control 144. The remote control 144 has an infrared (IR) signal emitter 146 which sends IR control signals to the IR receiver 148 as is well known in the art. The received control signals are then forwarded to the processor 116.

In the preferred embodiment of the present invention, the network architecture facilitates the upgrading of STTs 16 by permitting remote replacement of the PSP 128 resident within the STT 16 with a new PSP 129 without interrupting operation of the network 10 or the STT 16.

FIGS. 6–14 illustrate an adaptive protocol wherein a protocol syntax processor resident within a SST 16 may be remotely upgraded. This will be described in detail in what follows.

Figure 6:
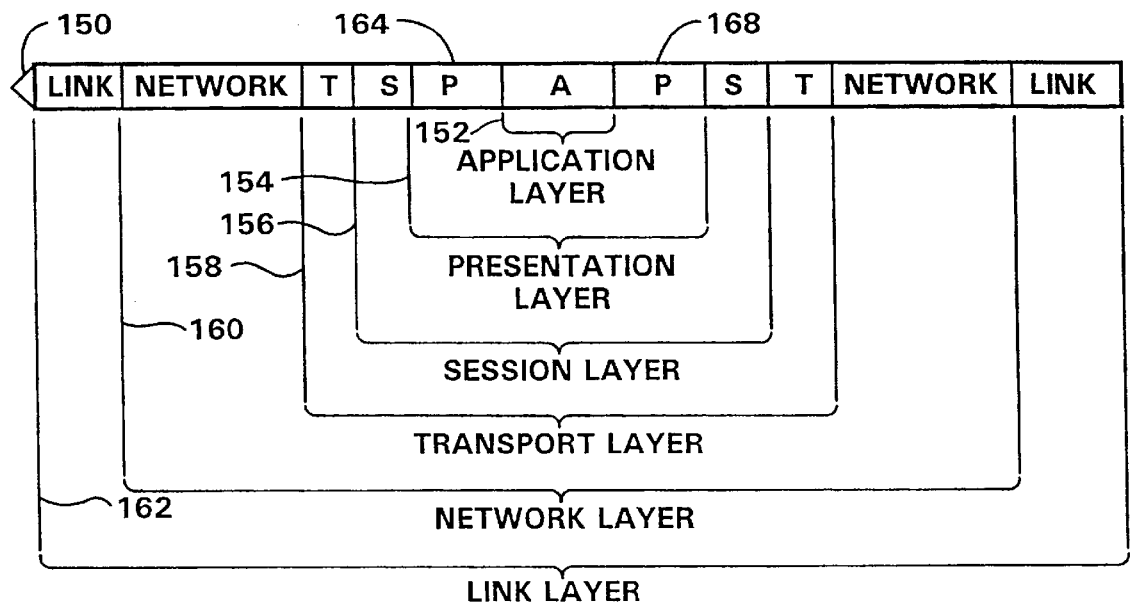
FIG. 6 is a prior art layered protocol stack.

FIG. 6 illustrates the basic layered protocol model which is well known to skilled artisans. The frame 150 comprises a signal transmitted through the network 10 from a source node, such as the network controller 62, to a destination node, such as the STT 16.

The frame 150 is arranged in nested layers. The layered model of FIG. 6 closely conforms to the reference model for Open Systems Interconnection (OSI) developed by the International Standards Organization, Geneva, Switzerland. Specifically, the ultimate "data to be transferred" is in the application layer 152. The application layer 152 is nested within the presentation layer 154. The presentation layer 154 is nested within the session layer 156, which is nested within the transport layer 158, and so on through the network layer 160 and the link layer 162. In general, each layer includes a header 164 (which precedes the application data 152) and a trailer 168 (which follows the application data 152). However, for any given layer, the respective header may be minimal and the respective trailer may be nonexistent.

The source node e.g. VIP 12, L1G 20, AC 24, NC 62 assembles the frame message layers (3–7) 150 before transmission to the STT 16 (destination node). The destination node parses the frame 150 one layer at a time. First, the destination node strips the link layer 162 from the frame. The "data" of the link layer 162 is the network layer 160. The "data" of the network layer 160 is the transport layer 158, and so on down to the application layer 152. Each layer of the protocol is assigned specific system communication functions as briefly outlined below.

The physical layer (not shown) is concerned with the electrical and mechanical characteristics associated with the physical network termination plug or socket. This includes the type of electrical signals used, the size and configuration of the connecting I/O plugs and the number and arrangement of pins.

The link layer 162 provides the means to transfer data reliably over the medium. As detailed above, the link layer 162 performs basic communication functions of medium access control when a shared medium is used, generation and checking of error detection codes, and source and destination node addressing within the network 10. The link layer 162 for shared media is typically divided into two sub-layers: the MAC sub-layer and the logical link control (LLC) sub-layer.

The network layer 160 specifies addressing and routing instructions to establish connections between the source and destination nodes located in different networks. The network layer 160 enables two networks to interconnect across one or more subnetworks, thereby providing a uniform end-to-end service to the transport layer.

The transport layer 158 governs the data flow between the source and destination nodes once a signal path connection has been established. Typical functions of the transport layer 158 include data flow control, error control and message fragmentation.

The session layer 156 provides the means for two communicating nodes to control their subsequent communication. It also provides means to allow a communication to be restarted at a pre-determined synchronization point in the event of a communication failure. The session layer 156 comprises a set of functional units which must be established when the session connection is set up.

The presentation layer 154 controls the format and syntax of data that is being exchanged between two communicating nodes. After a connection has been established, the presentation layer 154 allows the communicating nodes to establish a common syntax for the data to be exchanged.

The application layer 154 includes the programs to be utilized by the subscriber. For example, in a video-on-demand application, the application layer 154 may contain specific instructions for L2G menu navigation and selection by authorized subscribers.

Figure 7:
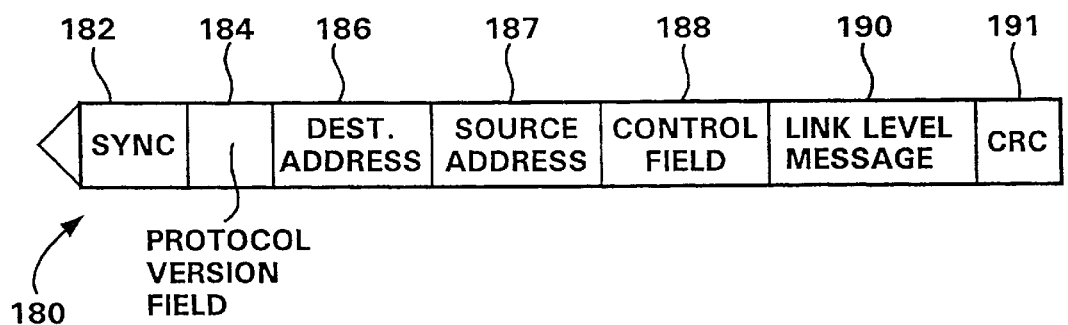
FIG. 7 is a prior art link level frame format used in conjunction with the protocol stack of FIG. 6.

FIG. 7 shows the prior art frame format 180 for the link layer protocol. A frame 180 includes a synchronization field 182 a protocol version field 184, a destination address field 186, a source address field 187, a control field 188, a link level message field 190 and a cyclic redundancy code field (CRC) 191.

Figure 8:
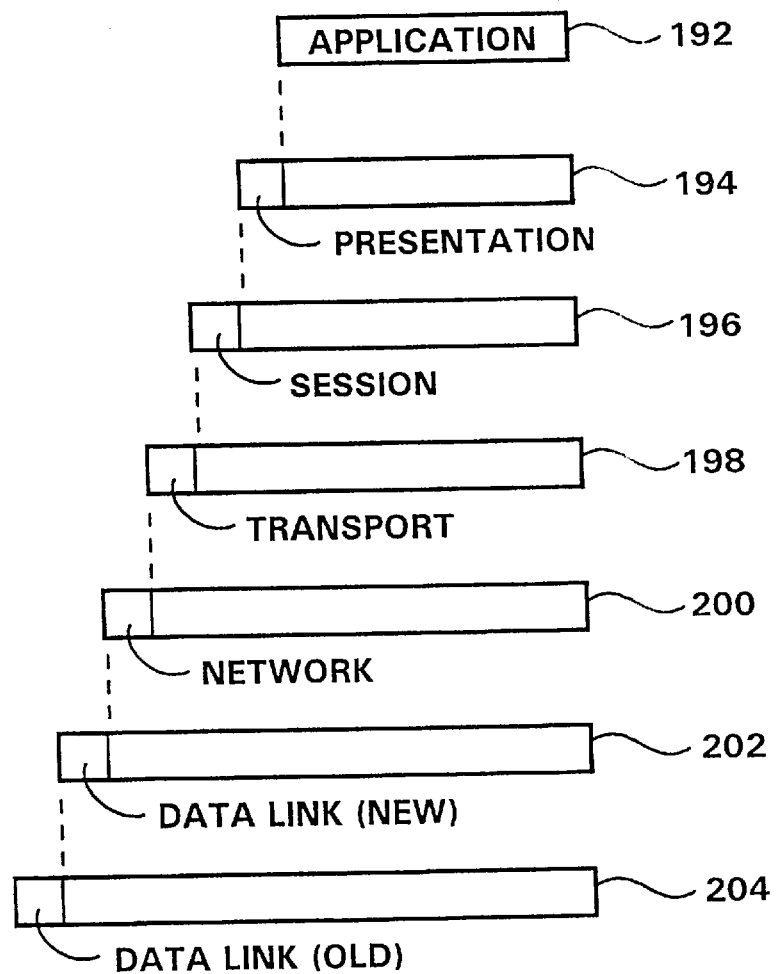
FIG. 8 is the ISO-OSI based protocol stack during protocol syntax processor upgrade in accordance with the present invention.

In contrast, FIG. 8 illustrates an ISO-OSI based layered protocol stack during protocol syntax processor upgrade. For clarity, only the heading of each layer is shown. The heading and the tail may include a full message, a nominal message or no message at all depending upon the frame to be sent. A given protocol stack may be comprised of any combination of layers. Further, not all layers need to be present in each protocol stack. The source node assembles the frame message starting with the application layer 192. The presentation layer 194 is then added, followed by the session layer 196, the transport layer 198 and the network layer 200. The protocol stack includes two data link layers: a new data link layer 202 which is nested within the old data link layer 204.

Figure 9:
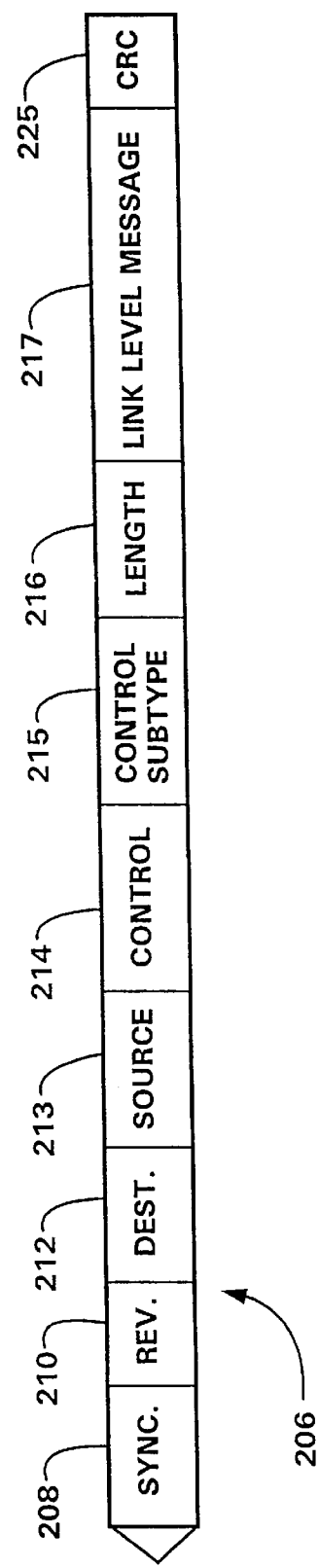
FIG. 9 is an example of a frame format of the link layer protocol.

FIG. 9 is an example of frame format of the link layer protocol 206. The frame 206 includes an eight bit synchronization field 208, an eight bit revision field 210, a twenty-four bit destination address field 212, a twenty-four bit source address field 213, an eight bit control field 214, an eight bit control subtype field 215, an eight bit length field 216, a link level message field 217 which may vary in length, and an eight bit CRC field 225.

The protocol sent from the master node to the slave node contains instructions regarding the PSP 128 for the APP 130 to follow. The control field 214 within the link layer protocol 206 identifies the type and format of the information to follow in the control subtype field 215, the length field 216, and the link level message field 217. The control field 214 prompts the APP 130 to receive and process the frames within the protocol in a certain manner. As shown in Table 2, the APP 130 may be instructed to update the existing PSP 128, accept a completely new PSP 129, or perform other actions on the PSP 128. It should be evident to those skilled in the art that other control field types may be specified at a later date and included within a new or revised PSP 128. Depending upon the type of control field 214, additional fields may be necessary. The number and length of additional fields are specified within the control subtype 215 and length 216 fields, respectively. The additional fields are then transmitted within the link level message field 217. The length field 216 indicates the length of the link level message 217 which, in essence, extends the length of the header. The length field 216 is indicative of how far the APP 130 must parse the frame in order to get to the new protocol. In this manner the standard length of each field, the number of fields and the function of each field may be changed without physically replacing the node.

TABLE 2

| | CTRL FIELD TYPE | LENGTH FIELD | ADDITIONAL FIELDS |
| --- | --- | --- | --- |
| 0 | Reserved | — | — |
| 1 | Update PSP | — | — |
| 2 | New PSP Frame | X | sequence number image section |
| 3 | Last PSP Frame | X | sequence number image section |
| 4 | Test New PSP | X | subtype, number of fields, . . . |
| 5 | Stand By | — | — |
| 6 | Activate PSP | — | — |
| 7 | Set New To Current | — | — |
| 8 | Use Current PSP | — | — |

The procedure for replacing a node's PSP 128 is shown in FIG. 10. Migration from the old PSP 128 to a new PSP 129 is controlled by a "master" node which directs all "slave nodes". In the preferred embodiment, the master node is the network controller 62 and the slave nodes are the STTs 16. The master node initiates protocol migration by sending a migration initiation message to the APP 130 within the slave node, to prepare to receive a new PSP 129.

The master node may initiate migration for all slave nodes, or may select specific slave nodes. The selection of slave nodes to be migrated to the new PSP 129 may occur in several different ways. In the preferred embodiment, the master node polls all slave nodes to determine the type and revision of PSP 128 resident within each node. Each slave node provides the requested information in response to the master node. Alternatively, the master node may execute a routine to interrogate each slave node to determine the type and revision of PSP 128 resident within each slave node. Depending upon the response, or lack thereof, from each slave node, the master node can determine which revision of PSP 128 is resident within each slave node. For example, if a slave node has an old PSP 128 revision, the slave node may be unable to respond to the query posed by the master node. Accordingly, the master node will determine that the PSP 128 resident within that slave node should be updated.

Once the protocol migration process is initiated, the master node sends PSP image frames to the APP 130 within the link level message 217 portion of the link level frames 206 as shown in FIG. 9. As shown in step 230 of FIG. 10, the APP 130 constructs, or loads, the new PSP image from the received frames 206 in RAM 122 that is not currently being used as directed by the memory manager 132. The memory manager 132 monitors and allocates usage of the RAM 122 by different processing components.

After construction of the new PSP 129 image is complete, the master node directs the APP 130 to enter a verification phase of the new PSP 129 at step 232. The APP 130 processes special test frames sent to it that use the old protocol syntax to encapsulate information represented in the new protocol syntax. The verification is carried out on the frame portion that is utilizing the new protocol to ensure that the new PSP 129 is operating properly. The verification ensures that the new PSP 129 properly processes the frames. If the new PSP 129 fails, at step 236, the APP 130 sends a frame resend request and other error messages to the master node.

Figure 11:
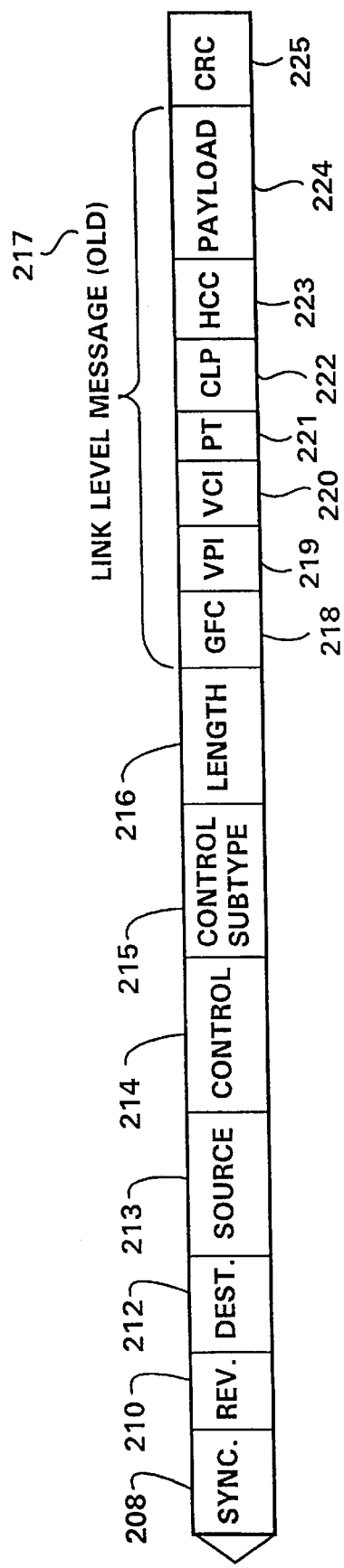
FIG. 11 is the frame format of FIG. 9 including the test frame structure.

The verification is performed utilizing the test frame structure shown in FIG. 11. The control field 214 and the control subtype field 215 identify the structure of the link level message field 217. For the verification phase, the control type will be 4/Test New PSP (as shown in Table 2). Table 3 displays the control subtypes associated with control type 4/Test New PSP.

TABLE 3

| CONTROL SUBTYPE | INFORMATION |
|---|---|
| 0 | Reserved |
| 1 | Image Checksum, image checksum value |
| 2 | Field Check, number of fields, field length (bits), field value |

There are two types of verifications as shown in Table 3; an image checksum and a field check. If the control type is 1/Image Checksum, the APP 130 performs a checksum of the downloaded PSP image to ensure that it is equal to the indicated image checksum value.

If the control subtype is 2/Field Check, the APP 130 performs a field check. As shown in Table 3, the control subtype 215 indicates the number of fields, the length of each field and the value utilized to test the field.

In order to test the fields, the values of each field are sent to the APP 130 along with the new protocol segment which is being tested. The APP 130 parses the new message and performs a calculation for comparison with the values indicated in the message. If they are not equal, an error message will be sent to the master node indicating that the slave node has failed the verification.

Figure 12:
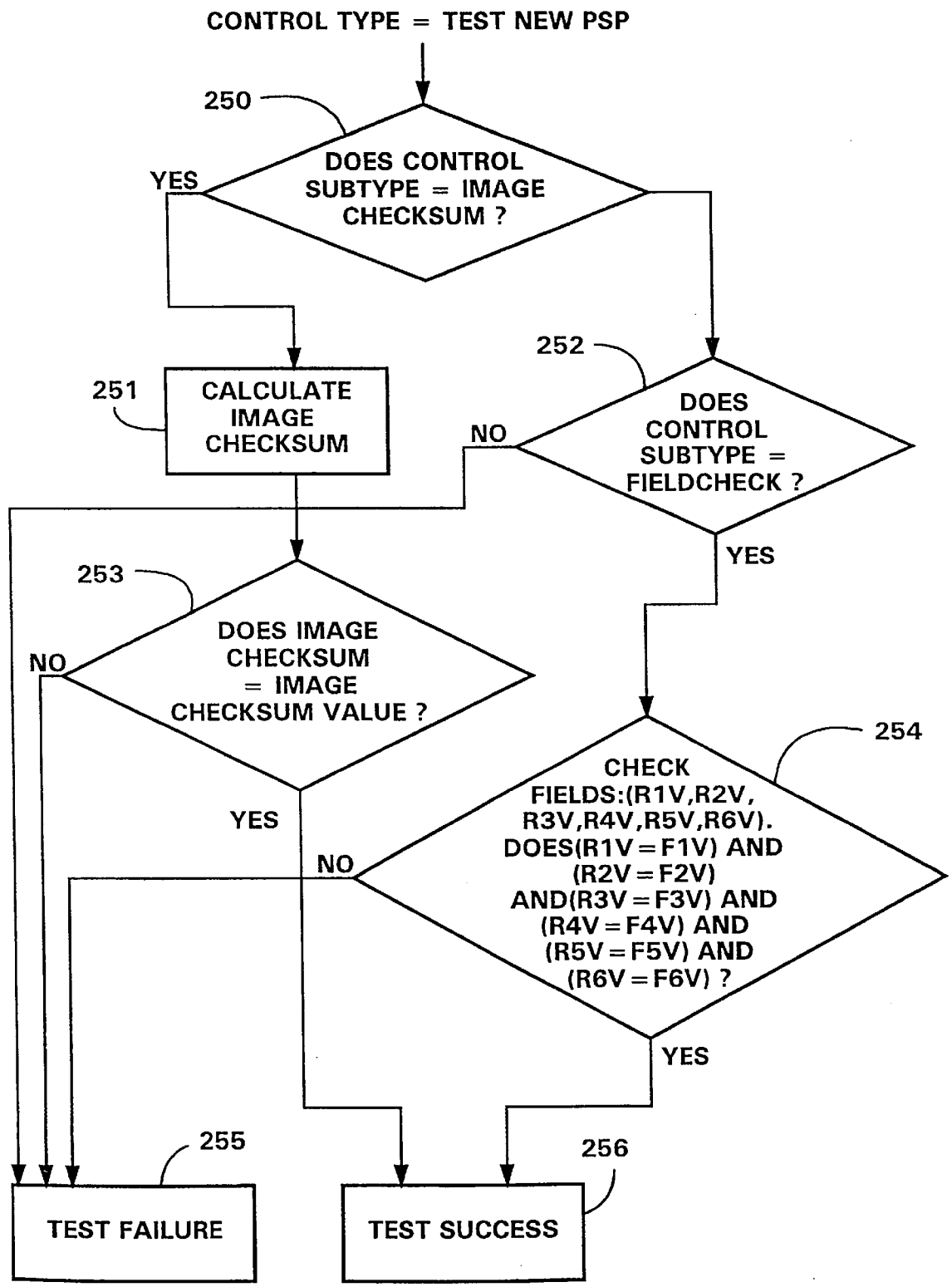
FIG. 12 is a flow diagram of the testing procedure of a new protocol syntax processor.

FIG. 12 illustrates the procedure for testing the new PSP 129 in accordance with control type 4. At step 250, it is determined if an image checksum will be performed. If so, the image checksum is calculated at step 251, and at step 253 is compared to the image checksum value that has been transmitted. Depending upon the results of the comparison, the PSP 129 will pass the test (step 256) or fail the test (step 255). Returning to step 250, if an image checksum is not to be performed, step 252 is entered to determine if a field check is to be performed. If not, the PSP 129 has failed the test (step 255). If a field check is to be performed, step 254 is entered and each field is checked to determine if the value of the field equals the values that have been transmitted. If any of the values are not equal, the PSP 129 has failed the test (step 255). If the values are equal, the PSP has passed the field check (step 256).

Figure 13:
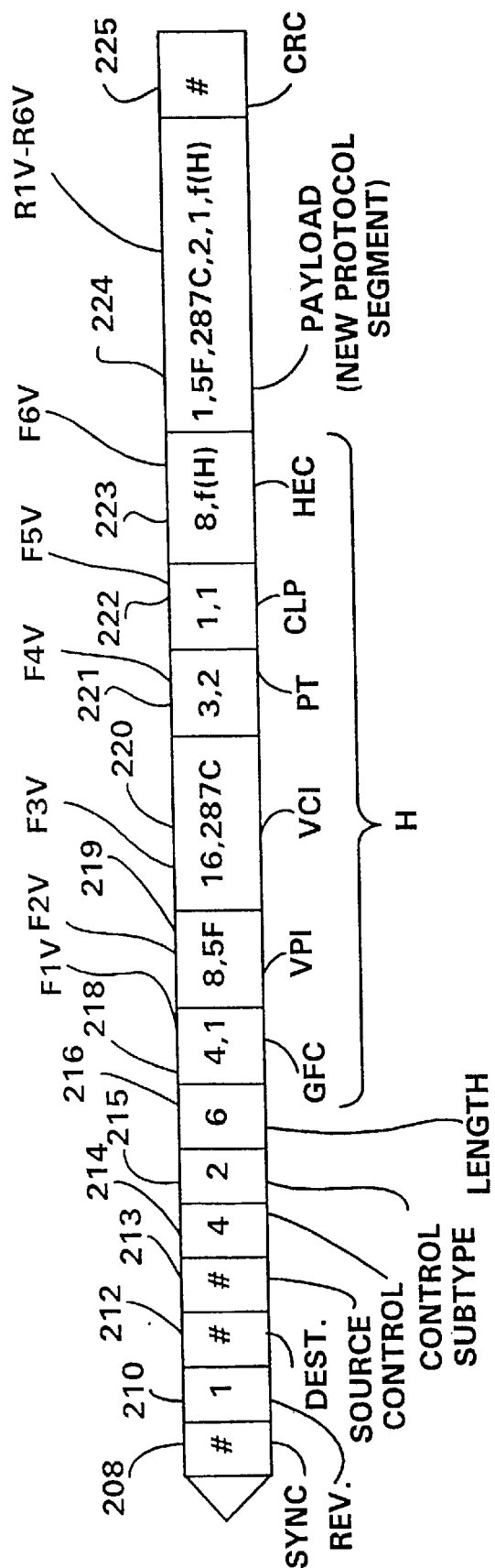
FIG. 13 is an example of values transmitted in the test frame format for a field check.

FIG. 13 is an example of values that could be transmitted in the test frame format in a field check. The frame begins with a sync number 208, a revision number 210, a destination address 212, a source address 213, and a control number 214. Since the control number is 4, the control type will be Test New PSP. The particular type of test is determined by the control subtype 215 which is 2, indicating a field check. The length field 216 indicates six fields to be checked. Each field indicates the length of the field and the value. Within the payload field 224 is included the new protocol segment which has formatted values as if it were a new message. The following fields, included within the link level message 217 as shown in FIG. 9, will be checked: a four bit generic flow control (GFC) field 218, an eight bit virtual path identifier (VPI) field 219, a sixteen virtual channel identifier (VCI) field 220, a three bit payload type (PT) field 221, a one bit cell loss priority (CLP) field 222, an eight bit header error check (HEC) field 223, and a variable length payload field 224.

The GFC field 218 is used to ensure fair and efficient access between multiple devices sharing a medium. The VPI field 219 allows a group of virtual connections, called virtual paths, to be identified. The VCI field 220 identifies the individual virtual connections within each virtual path. The PT field 221 is used to distinguish user information and network information. The CLP field 222 permits two priorities of cell to be defined where the network may discard low priority cells under congestion conditions. The value of the HEC field 223 is a function of the header (H). The HEC field 223 provides an eight bit cyclic redundancy check on the contents of the cell header. A detailed description of the function of these fields is outside the scope of this disclosure. (The definition of these fields is consistent with CCITT Recommendations 1.150 and 1.361 (Geneva, June 1992)). This is an example of the fields which are part of a new protocol which is encapsulated within the old protocol format.

If the PSP 129 has failed the verification, the master node will note that an error has occurred and will restart the migration procedure. After a predetermined number of failed migration attempts, the master node will abort the migration procedure and tag the particular slave node for servicing. Thereafter, all tagged slave nodes will be repaired or replaced. If the new PSP 129 passes the verification, the slave node is placed in a standby mode, as shown in FIG. 10 at step 234. In this mode, the slave node is able to accept and process incoming frames with the new PSP 129 but is able to default to the old PSP 128. The master node repeats the process with other slave nodes until all slave nodes of interest have gone through migration to the new PSP 129.

Once the new PSP 129 has been installed on all of the slave nodes of interest, the transmission network 10 equipment upgrades associated with the new protocol, if any, may be performed. The master node then sends an activate frame using the new protocol format to all STT 16. In step 238, the slave nodes erase the old PSP 128 and execute the new PSP 129 thereafter. This step may be delayed for a defined period of time after which no node failures occur due to the PSP 129 upgrade. The slave node then exits the PSP upgrade procedure.

Figure 15:
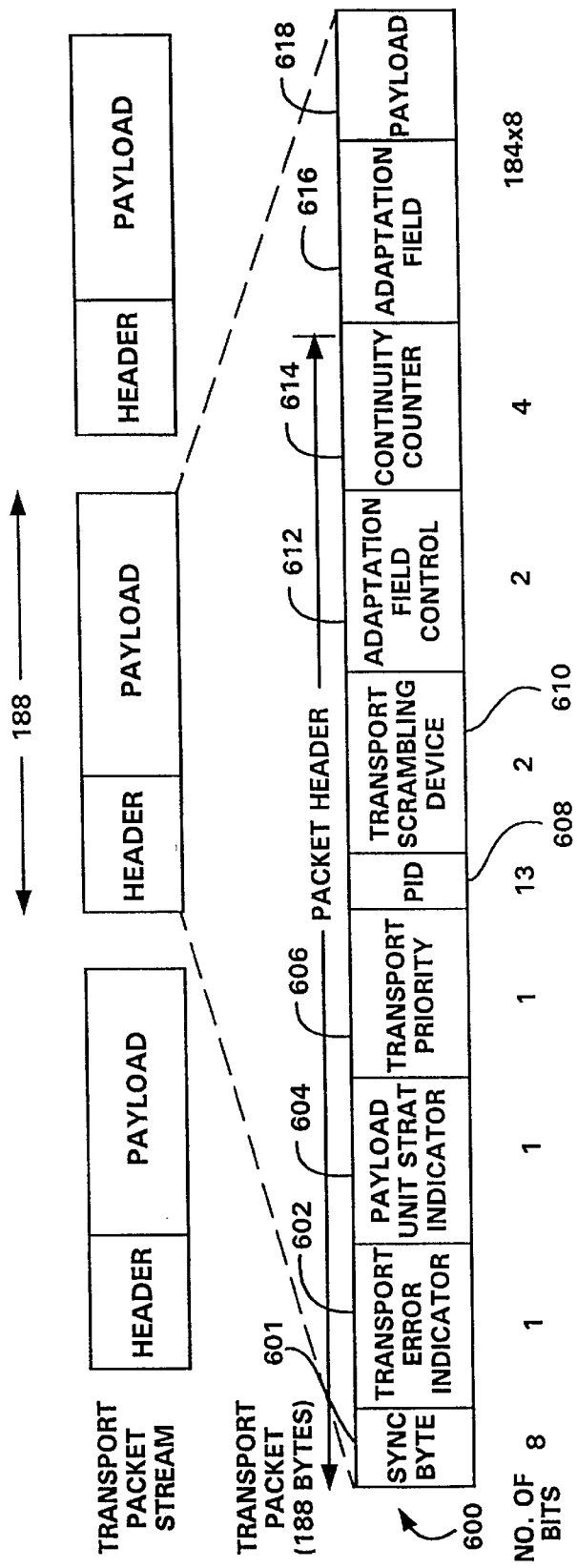
FIG. 15 is the preferred MPEG2 based DLL packet sublayer of the present invention.
Figure 16:
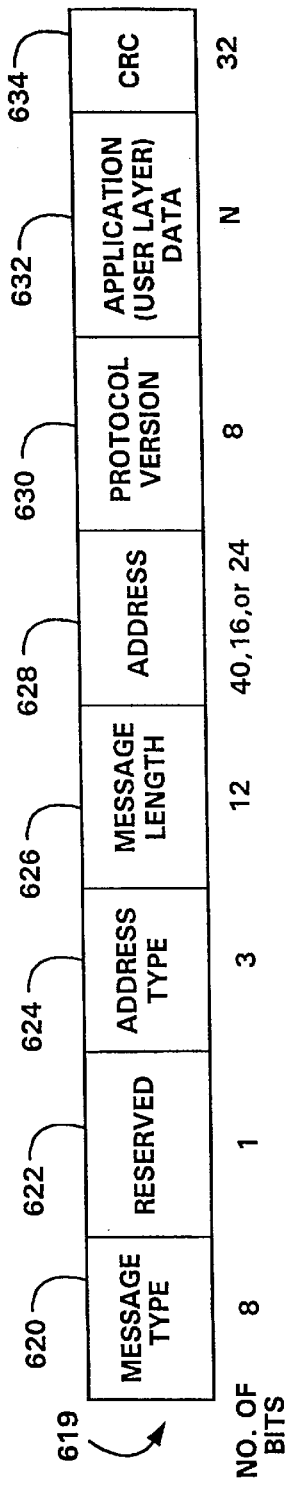
FIG. 16 is the preferred MPEG2 based DLL message sublayer of the present invention.

Although reference has been made to several different frame formats as examples of the operation of the adaptive protocol, the preferred format is an MPEG2 compliant frame/packet format as shown in FIGS. 15 and 16. Referring to FIG. 15, the DLL packet sublayer frame 600 contains an eight bit sync field 601, a one bit transport error indicator field 602, a one bit payload unit start indicator field 604, a one bit transport priority field 606, a thirteen bit packet identifier field 608, a two bit transport scrambling control field 610, a two bit adaptation control field 612, a four bit continuity counter field 614, and an adaptation field 616 and payload field 618 comprising 184 bytes.

The transport error indicator field 602 is a one bit flag that indicates that at least one uncorrectable bit error exists in the associated transport packet. The payload unit start indicator field 604 has a nominative meaning for transport packets that carry packetized elementary stream (PES) or program specific information (PSI) data as well as private data. A logical one indicates that the payload of this transport packet will commence with a pointer to the start of a message. The transport priority field 606 is a flag to indicate that the associated packet is of greater priority than packets within the same PID stream that do not have the flag. The packet identifier field 608 indicates the type of data stored in the packet payload. The transport scrambling control field 610 indicates whether or not the payload is scrambled (encrypted). The adaptation field control field 612 indicates whether the transport packet header is followed by an adaptation field and/or a payload. The continuity counter field 614 is an incremental counter which increments with each transport packet with the same PID. The preferred embodiment of the present invention does not use the adaptation field 616 for non-audio or video elementary streams.

The message sublayer frame 619 of FIG. 16 is segmented and transported within the payload field 618 of DLL packet sublayer frame 600. The frame includes an eight bit message type field 620, a one bit reserved field 622, a three bit address type field 624, a twelve bit message length field 626, a forty, sixteen, or twenty-four bit address field 628, an eight bit protocol version field 630, an n-bit application (user layer) data field 632, and a thirty-two bit CRC (cyclic redundancy code) field 634.

The message type field 620 is an eight bit field that distinguishes the type of application and the associated application layer message structure. The MPEG2 table format field 622 is a one bit flag that indicates if the message structure conforms to those previously defined. The address type field 624, is defined as:

0=Broadcast
1=Singlecast type 1:40 bit physical address
2=Singlecast type 2:40 bit logical address
3=Multicast type 1:40 bit address
4=Multicast type 2:16 bit address
5=Multicast type 3:24 bit address The protocol version field 630 indicates the version of the application message syntax. If the protocol-version number is recognized, the message/frame may be processed, otherwise it is discarded. The message body field 632 may consist of up to 1024 bytes of application layer protocol. The CRC field 634 provides a means of error detection.

During the migration of the STTs 16 to the new PSP 129, a slave node may "crash" or lose communication with the master node. Accordingly, a recovery procedure is provided for reestablishing communication with the master node. The recovery procedure is facilitated by two features: 1) a universal subframe, and 2) a primitive PSP. The master node uses a universal subframe whenever the absence of a previously resident slave node is detected. The absence of a slave node is detected when the master node receives no response to instructions sent to a slave node. The universal subframe comprises a predefined bit pattern recognizable to the slave node when the slave node is attempting recovery. A primitive PSP that recognizes the universal subframe is included within the APP 130.

The universal subframe and the primitive PSP enable downloading of the current PSP, in accordance with the procedure previously described, even when the STT 16 is operating in a degraded condition (i.e. is operating with no other PSP than the primitive PSP). The new PSP image data is appended to the universal subframe to enable the primitive PSP to recognize the frame and deliver the image information to the APP 130 for the construction of the new PSP. After recovery, the slave node has the most current PSP being used by the STTs 16.

Figure 14:
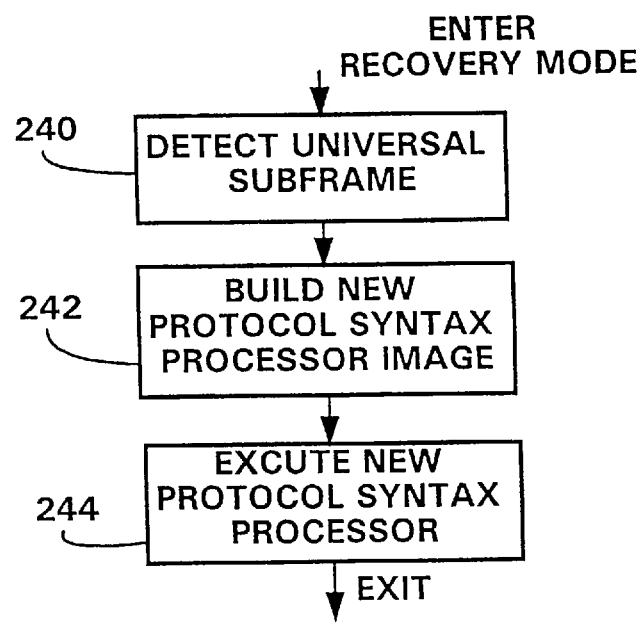
FIG. 14 is a flow diagram of the recovery procedure of the slave node of the present invention.

The recovery procedure is shown in FIG. 14. As the slave node enters the recovery mode, it detects the universal subframe at step 240, and sends the master node a verification message that the subframe has been detected. The APP 130 utilizes the data appended on to the universal subframe to build the new PSP image in the RAM 122 at step 242. After construction of the new PSP 129 is complete, the slave node executes the new PSP at step 244 and exits the recovery mode.

The operation of the adaptive protocol scheme may be best described by using a state transition table representation as shown below. The scheme comprises the following four states: 1) current state, 2) input event, 3) next state, and 4) output event. The current state is a state that the APP 130 is in prior to receiving an input event. An input event is a message from the master node which causes the APP 130 to perform certain actions and proceed to the next state. The next state corresponds to actions taken by the slave node and the following state transition. The output event corresponds to the message generated from the slave node to the master node.

TABLE 4

| Current State | Input Event | Next Action/State | Output Event |
|---|---|---|---|
| Use-Current-PSP | Expected event Rx-Update-PSP | Prepare for New-PSP | |
| | Unexpected events Rx-New-PSP-Frame Rx-Last-PSP-Frame Rx-Test-New-PSP-Frame Rx-Standby-Frame | | |
| | Rx-Activate-New-PSP Rx-Set-New-To-Current Rx-Use-Curr-PSP | Use-Current-PSP | Tx-Event-Out-of-Sync (event, curr-state) |

TABLE 4-continued

| Current State | Input Event | Next Action/State | Output Event |
|---|---|---|---|
| Prepare-for-New-PSP | Expected event<br>Rx-Update-PSP | Prepare-for-New-PSP | |
| | Expected event<br>Rx-New-PSP-Frame | Build-New-PSP-Image | |
| | Unexpected events<br>Rx-Update-PSP<br>Rx-Last-PSP-Frame<br>Rx-Test-New-PSP-Frame<br>Rx-Standby-Frame<br><br>Rx-Activate-New-PSP<br>Rx-Set-New-To-Current<br>Rx-Use-Curr-PSP | Act 01: Abort &<br>Cleanup, Use-Current-PSP | Tx-Event-Out-of-Sync (event, curr-state) |
| Build-New-PSP-Image | Expected event<br>Rx-New-PSP-Frame | Build-New-PSP-Image | |
| | Expected event<br>Rx-Last-PSP-Frame | Test-New-PSP | |
| | Unexpected event<br>Rx-Update-PSP<br>Rx-Test-New-PSP-Frame<br>Rx-Standby-Frame<br>Rx-Activate-New-PSP<br>Rx-Set-New-To-Current | Act 01: Abort &<br>Cleanup<br>Build-New-PSP-Image | Tx-Event-Out-of-Sync (event, curr-state) |
| | Unexpected event<br>Detect-out-of-Sync-Frame* | Build-New-PSP-Image | Tx-Frame-Out-of-Sync (frame-sequence-no) |
| | Unexpected event<br>Rx-Use-Curr-PSP | Act 01: Abort &<br>Cleanup, Use-Current-PSP | Tx-Event-Out-of-Sync (event, curr-state) |
| Test-New-PSP | Expected event<br>Rx-Test-New-PSP-Frame | Test-New-PSP | If test result<br>< > unsuccessful,<br>TX-test-Failure<br>(failure code) |
| | Expected event<br>Rx-Standby-Frame | Standby | |
| | Expected event<br>Rx-Test-New-PSP-Frame<br>Rx-Last-PSP-Frame<br>Rx-Update-PSP<br>Rx-New-PSP-Frame<br>Rx-Set-New-To-Current | Test-New-PSP | Tx-Event-Out-of-Sync (event, curr-state) |
| | Unexpected event<br>Rx-Use-Curr-PSP | Act 01: Abort &<br>Cleanup, Use-Current-PSP | Tx-Event-Out-of-Sync (event, curr-state) |
| Standby | Expected event<br>Rx-Standby-Frame | Standby | |
| | Expected event<br>Rx-Activate-New-PSP | Use-New-PSP | |
| | Expected event<br>Rx-Test-New-PSP-Frame<br>Rx-Last-PSP-Frame<br>Rx-Update-PSP-Frame<br>Rx-New-PSP-Frame<br>Rx-Set-New-To-Current | Standby | Tx-Event-Out-of-Sync (event, curr-state) |
| | Unexpected event<br>Rx-Use-Curr-PSP | Act 01: Abort &<br>Cleanup, Use-Current-PSP | Tx-Event-Out-of-Sync (event, curr-state) |
| Use-New-PSP | Expected event<br>Rx-Set-New-To-Current | Act 02: Final-Cleanup<br>Use-Current-PSP | |
| | Expected event<br>Rx-Update-PSP<br>Rx-New-PSP-Frame<br>Rx-Last-PSP-Frame<br>Rx-Test-New-PSP<br>Rx-Standby-Frame<br>Rx-Activate-New-PSP | Use-New-PSP | Tx-Event-Out-of-Sync (event, curr-state) |
| | Unexpected event<br>Rx-Use-Curr-PSP | Act 01: Abort & | Tx-Event-Out-of- |

TABLE 4-continued

| Current State | Input Event | Next Action/State | Output Event |
|---|---|---|---|
| | | Cleanup Use-Current-PSP | Sync (event, curr-state) |

Each transition to or from the states in Table 4 has a set of actions associated with it. A transition to a more advanced state is conditional upon getting an expected outcome from the response of each current state to the input event. If an expected state is not achieved, the APP 130 will remain in the current state or revert to a previous state.

The adaptive protocol scheme described herein not only permits upgrading of STTs 16, but also adaptation of STTs 16 belonging to one network to another new network, where the latter uses a different communication network infrastructure. This eliminates the need for maintaining two or more separate networks and enables all systems to migrate to the latest system, provided the STT 16 hardware does not require any changes. This approach eliminates the backward capability limitations imposed by fixed protocols by enabling the migration of existing systems to new protocols to take advantage of new, more enabling protocols in a cost effective manner.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

I claim:

1. A settop terminal for a CATV communication system having a headend and at least one settop terminal, wherein the settop terminal uses a central processing unit and associated memory for processing communication data comprising:
   a protocol syntax processor, for processing communication data of a first format between the headend and the settop terminal; and
   an adaptive protocol processor for enabling the settop terminal to process communication data of a second different format, including:
   means for receiving data through the protocol syntax processor;
   means for constructing a new protocol syntax processor from said data;
   means for testing said new protocol syntax processor; and
   means for rerouting communication data from the protocol syntax processor to said new protocol syntax processor.

2. The settop terminal of claim 1 wherein said adaptive protocol processor is resident in a ROM and includes a primitive protocol syntax processor for recognizing specific communication data and establishing communications with the headend after the settop terminal returns from an off-line condition.

3. The settop terminal of claim 2 wherein said primitive protocol syntax processor and said adaptive protocol processor are resident within a ROM.

4. The settop terminal of claim 1 wherein said protocol syntax processor and said adaptive protocol processor are resident within RAM.

5. The settop terminal of claim 1 further including a memory manager for monitoring and clearing RAM memory that is not currently being utilized by the central processing unit.

6. The settop terminal of claim 1 wherein said means for testing includes means for comparing test results with expected results to determine the operability of the new protocol syntax processor.

7. The settop terminal of claim 6 wherein said expected test results are received by said data receiving means with said communication data.

8. The settop terminal of claim 1 wherein said data receiving means includes means for receiving image frames; said image frames having a variable length and a variable number of fields.

9. A CATV communication network having at least one headend unit and a plurality of settop terminals; said headend unit for controlling communication with said plurality of settop terminals via a plurality of selected protocol formats; said settop terminals having a central processing unit and an associated memory; the network comprising:
   said headend unit having:
      means for transmitting communications in a first protocol format to said settop terminals; and
      means for transmitting data in said first protocol format to enable a settop terminal to receive and process communications in a second protocol format; and
   each said settop terminal having:
      a protocol syntax processor for processing data in said first protocol format; and
      adaptive protocol processor means for enabling the settop terminal to process data in said second protocol format, including:
         means for receiving processor construction data in said first protocol format;
         means for constructing a new protocol syntax processor for processing data in said second protocol format from said processor construction data;
         means for testing said new protocol syntax processor; and
         means for rerouting communications from said protocol syntax processor to said new protocol syntax processor.

10. The network of claim 9 wherein said headend further including means for determining which settop terminals are able to receive and process communications in said second selected protocol format.

11. The network of claim 10 wherein said determining means further includes means for polling the settop terminals to determine which settop terminals are using said first protocol format and which settop terminals are using said second protocol format.

12. The network of claim 11 wherein said transmitting means transmits data including a new protocol syntax processor to the settop terminals using said first protocol format to enable the settop terminals to process said second protocol format.

13. The network of claim 12 wherein said headend unit verifies the operability of said protocol syntax processor by transmitting special test frames using said first protocol format to encapsulate information in said second protocol format.

14. The network of claim 13 wherein said means for testing further includes means for comparing test results with expected test results to determine the operability of the new protocol syntax processor.

15. The network of claim 14 wherein said expected test results are received by said data receiving means within said special test frames.

16. The network of claim 10 wherein said means for determining further includes means for interrogating the settop terminal to determine which settop terminals are able to process said second protocol format.

17. The network of claim 9 wherein said adaptive protocol processor is resident in a ROM and includes a primitive protocol syntax processor for recognizing a specific universal subframe to re-establish communication with said headend after the settop terminals return from an off-line condition.

18. The network of claim 17 wherein said primitive protocol syntax processor and said adaptive protocol processor are resident within a ROM.

19. The network of claim 9 wherein said protocol syntax processor and said adaptive protocol processor are resident within RAM.

20. The network of claim 9 further including a memory manager for monitoring and clearing RAM memory that is not currently being utilized by the central processing unit.

21. The network of claim 9 wherein said data receiving means includes means for receiving image frames from said headend having variable lengths and number of fields.

22. A method for changing protocol syntax processors from a first protocol syntax processor which processes data of a first format to a second protocol syntax processor which processes data of a second format without interrupting operation of a data transmission system comprising:

receiving data in said first format through said first protocol syntax processor;

constructing a new protocol syntax processor from said received data;

testing said second protocol syntax processor; and rerouting data from said first protocol syntax processor to said second protocol syntax processor.

23. The method of claim 22 wherein said second protocol syntax processor is constructed in NVRAM.

24. The method of claim 23 further including the step of receiving instructions to prepare for said second protocol syntax processor.

25. The method of claim 24 wherein said protocol syntax processor is removed from said NVRAM memory after communications from the protocol syntax processor are rerouted to said second protocol syntax processor.

26. The method of claim 23 wherein the step of testing further includes using said first protocol syntax processor to verify the operability of said second protocol syntax processor.

27. The method of claim 23 wherein a memory manager determines the location in memory of the said second protocol syntax processor.

28. The method of claim 23 wherein the method for changing protocol syntax processors is directed by an adaptive protocol processor which is resident in RAM.

* * * * *